(12) United States Patent
Shaeffer et al.

(10) Patent No.: US 10,919,353 B2
(45) Date of Patent: *Feb. 16, 2021

(54) RECEPTACLE ASSEMBLIES

(71) Applicant: R&S Shaeffer Properties LLC, Ector, TX (US)

(72) Inventors: Ricky David Shaeffer, Bonham, TX (US); Jared Tanner Shaeffer, Bonham, TX (US)

(73) Assignee: R&S Shaeffer Properties LLC, Ector, TX (US)

( * ) Notice: Subject to any disclaimer, the term of this patent is extended or adjusted under 35 U.S.C. 154(b) by 176 days.

This patent is subject to a terminal disclaimer.

(21) Appl. No.: 15/414,246

(22) Filed: Jan. 24, 2017

(65) Prior Publication Data

US 2018/0006417 A1 Jan. 4, 2018

Related U.S. Application Data

(63) Continuation of application No. 15/197,328, filed on Jun. 29, 2016, now Pat. No. 9,590,342.

(51) Int. Cl.
*B60D 1/64* (2006.01)
*H01R 27/02* (2006.01)
*H01R 31/06* (2006.01)

(52) U.S. Cl.
CPC ............. *B60D 1/64* (2013.01); *H01R 27/02* (2013.01); *H01R 31/06* (2013.01); *H01R 2201/26* (2013.01)

(58) Field of Classification Search
CPC ..... H01R 2201/26; H01R 13/052; B60D 1/64
See application file for complete search history.

(56) References Cited

U.S. PATENT DOCUMENTS

| 3,008,116 A | 11/1961 | Blanchenot |
| 3,915,476 A | 10/1975 | Burkle |
| 4,249,125 A | 2/1981 | Carver |

(Continued)

OTHER PUBLICATIONS

7-Way Molded Connector w/ Cable, Cequent Performance Products, retrieved on Sep. 14, 2016, http://www.bargman.com/products/vehicle-trailer-wiring/6-7-way-connectors/7-way-molded-connector-w-cable/biU%7CZjBAz8ivEQffw660XLyb1eUS3m%7CrPU5bN30bfLg=(2 pages).

(Continued)

*Primary Examiner* — Ross N Gushi
(74) *Attorney, Agent, or Firm* — Maschoff Brennan

(57) ABSTRACT

A receptacle assembly includes a receptacle housing, a housing opening, a first receptacle connector, and a second receptacle connector. The receptacle housing includes a first cavity that extends from a first end to a central structure. The housing opening is defined at the first end. The first cavity and the housing opening are sized and shaped to enable insertion of a plug assembly constructed to comply with the Society of Automotive Engineers J2863 standard. The first receptacle connector includes a first portion that extends from the central structure into the first cavity. The second receptacle connector includes a second portion that extends from the central structure into the first cavity. The first and the second receptacle connectors are sized and are disposed such that they are configured to both be inserted into a single connector cavity of the plug assembly and such that they are electrically insulated from one another.

20 Claims, 29 Drawing Sheets

(56) References Cited

U.S. PATENT DOCUMENTS

| | | | |
|---|---|---|---|
| 4,842,532 | A | 6/1989 | Krause |
| 5,302,141 | A | 4/1994 | O'Reilly et al. |
| 5,385,476 | A | 1/1995 | Jasper |
| 5,626,479 | A | 5/1997 | Hughes |
| 5,800,188 | A | 9/1998 | Barber et al. |
| 6,027,377 | A | 2/2000 | Wang |
| 6,447,302 | B1 | 9/2002 | Davis |
| 6,533,465 | B1 | 3/2003 | Lesesky et al. |
| 6,695,621 | B1 | 2/2004 | Wang |
| 6,749,438 | B1 | 6/2004 | Scheller et al. |
| 6,814,581 | B2 | 11/2004 | Matsuo |
| 7,118,379 | B1 | 10/2006 | Wang |
| 7,534,108 | B1 | 5/2009 | Wang |
| 7,594,816 | B1 | 9/2009 | Wang |
| 7,601,007 | B1 | 10/2009 | Pogue |
| 8,932,065 | B2 * | 1/2015 | Gerling |
| 9,590,342 | B1 * | 3/2017 | Shaeffer ................. H01R 27/02 |
| 2008/0113522 | A1 | 5/2008 | Wagner |
| 2014/0017910 | A1 | 1/2014 | Gerling |
| 2015/0084504 | A1 | 3/2015 | Rokenbrodt et al. |

OTHER PUBLICATIONS

International Search Report and Written Opinion dated Sep. 22, 2017 in related PCT Application No. PCT/US17/38396 (7 pages).

\* cited by examiner

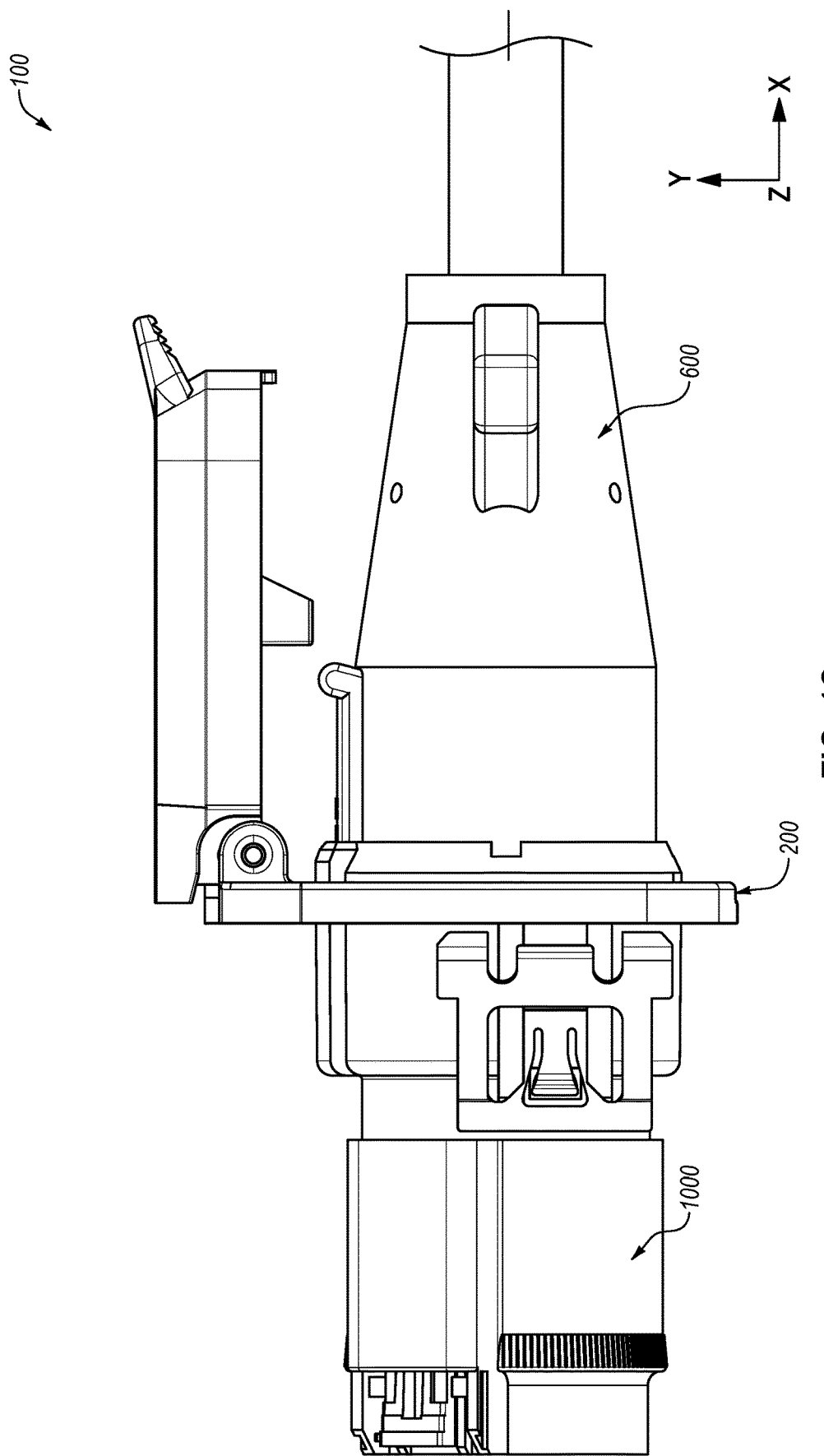

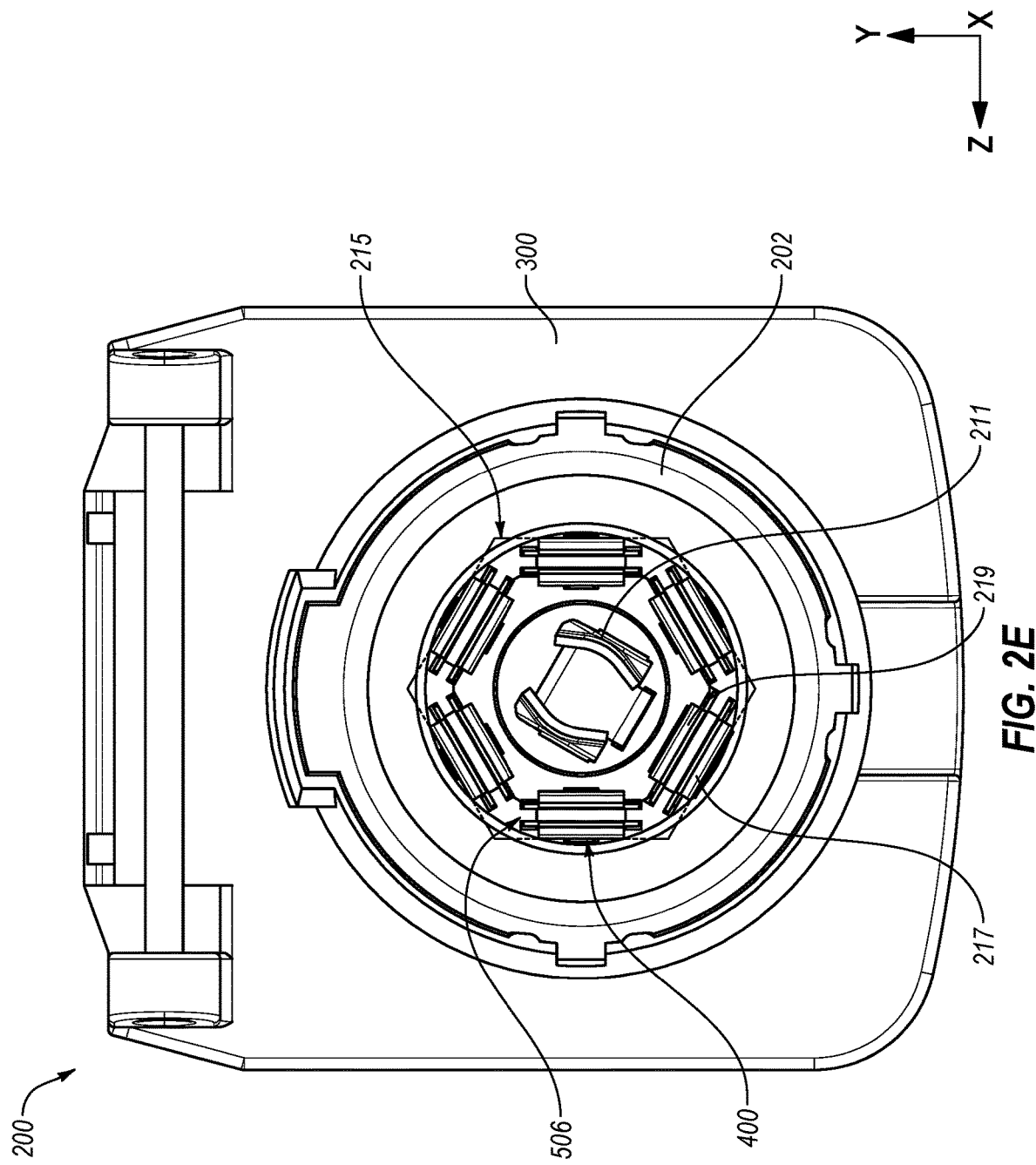

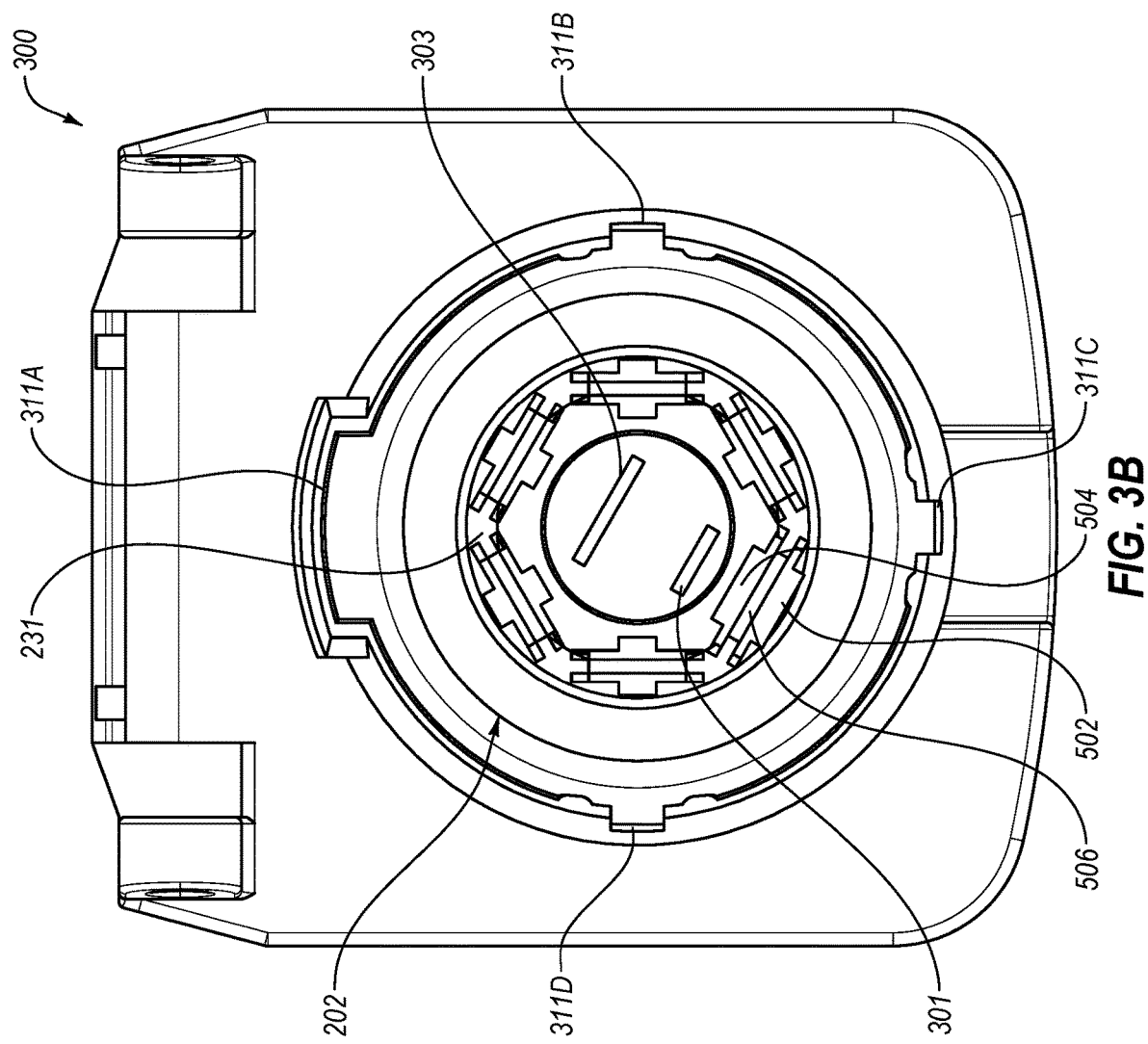

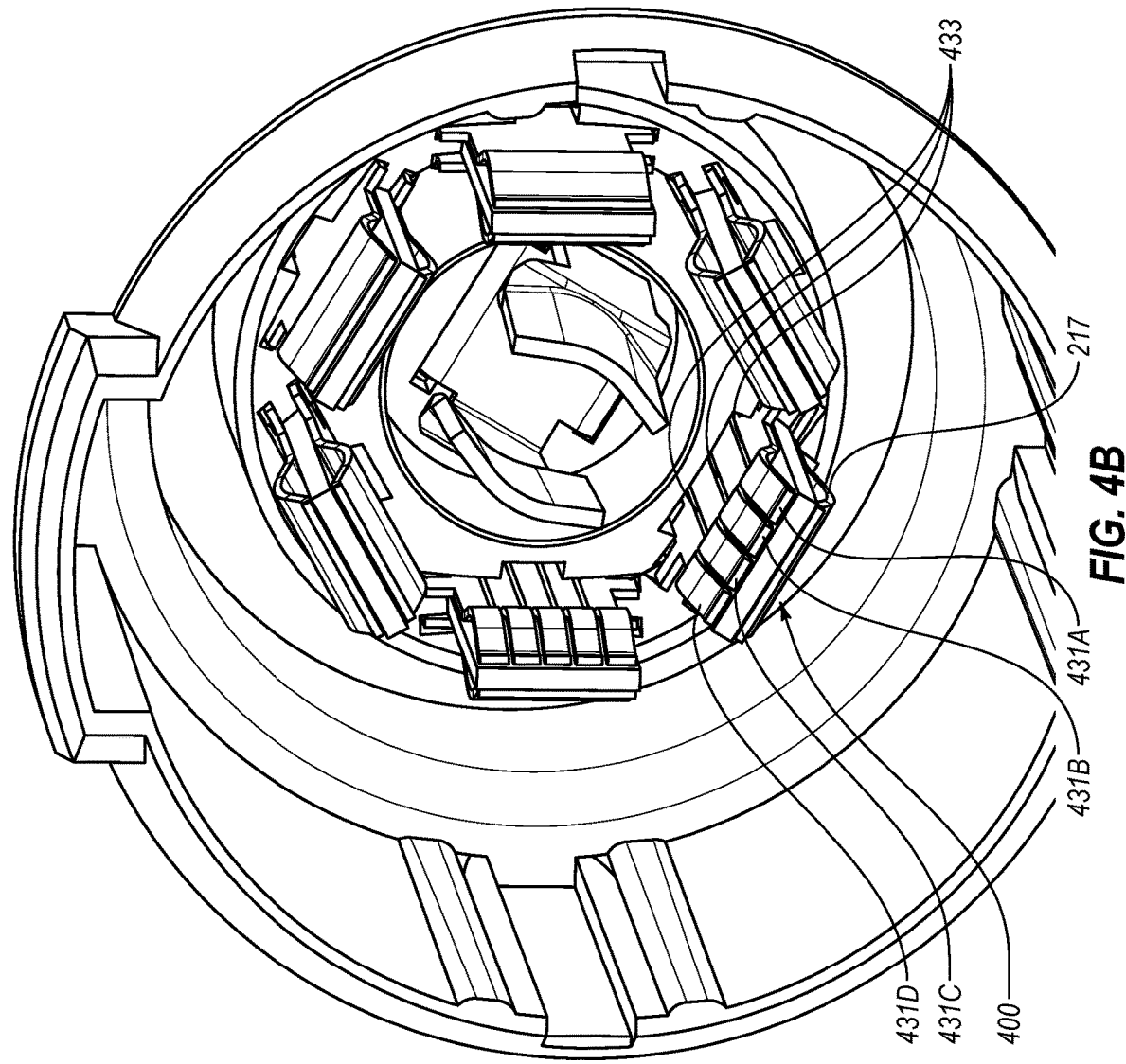

RECEPTACLE ASSEMBLIES

CROSS-REFERENCE TO RELATED APPLICATIONS

This application is a continuation of U.S. application Ser. No. 15/197,328, filed Jun. 29, 2016. The foregoing application is incorporated herein by reference in its entirety.

FIELD

The embodiments described in this disclosure are related to receptacle assemblies.

BACKGROUND

When towing and otherwise using a trailer, electrical signals may be communicated between a tow vehicle and the trailer via a vehicle-trailer wiring connector assembly (hereinafter, connector assembly). Generally, the connector assembly includes a receptacle assembly that is physically coupled to the tow vehicle and a plug assembly that is physically coupled to trailer. The receptacle assembly is wired to one or more systems of the tow vehicle and retains electrical connectors. Similarly, the plug assembly is wired to one or more systems of the trailer and retains corresponding electrical connectors. The plug assembly may be positioned within the receptacle assembly. When the plug assembly is positioned in the receptacle assembly, the electrical connectors retained in the receptacle assembly are electrically connected to the corresponding electrical connectors of the plug assembly. Accordingly, when the plug assembly is positioned in the receptacle assembly, electrical signals that originate in the tow vehicle may be communicated to the trailer via the electrically connection of the connector assembly.

The connector assembly and components thereof may be constructed according to one or more connector assembly standards. The connector assembly standards may include dimensions of the connector assembly and components thereof as well as a wiring guide. The connector assembly standards help ensure that the plug assembly fits into and is retained by the receptacle assembly and help ensure that each of the electrical connectors retained in the receptacle assembly is electrically connected with the corresponding electrical connector retained in the plug assembly.

One connector assembly standard provides dimensions and a wiring guide for seven-way connector assemblies. Connector assemblies constructed according to the seven-way connector assembly standard include a central electrical connector and six electrical connectors that surround the central electrical connector. Connector assemblies constructed according to the seven-way connector assembly standard include an electrical connector for a ground, a brake controller, a left turn and left stop light, a right turn and right stop light, reverse (or back-up) lights, a 12 volt auxiliary power, and tail and running lights. There is a seven-way connector assembly standard for round electrical connectors and for blade-style electrical connectors. In general, the round electrical connectors are used in heavy-duty applications, while blade-style electrical connectors are used in recreational vehicles, cargo trailers, fifth wheels, campers, and other types of trailers. An example standard for the round electrical connectors is the Society of Automotive Engineers (SAE) J560b standard, which is incorporated in the present disclosure by reference in its entirety. An example standard for the blade-style electrical connectors may include the SAE J2863 standard, which is incorporated in the present disclosure by reference in its entirety.

The subject matter claimed in the present disclosure is not limited to embodiments that solve any disadvantages or that operate only in environments such as those described above. Rather, this background is only provided to illustrate one example technology area where some embodiments described herein may be practiced.

SUMMARY

An aspect of the present disclosure is a receptacle assembly for a vehicle-trailer wiring connector assembly. The receptacle assembly may include a receptacle housing, a housing opening, a first receptacle connector, and a second receptacle connector. The receptacle housing may include a first cavity. The first cavity may extend from a first end of the receptacle housing to a central structure of the receptacle housing. The housing opening may be defined at the first end. At least a portion of the first cavity and at least a portion of the housing opening may be sized and shaped to enable insertion of a plug assembly that is constructed to comply with the Society of Automotive Engineers ("SAE") J2863 standard. The first receptacle connector may include a first portion that may extend from the central structure into the first cavity. The second receptacle connector may include a second portion that extends from the central structure into the first cavity. The first receptacle connector and the second receptacle connector may be sized and may be disposed with respect to each other such that the first receptacle connector and the second receptacle connector are configured to both be inserted into a single connector cavity of the plug assembly and such that the second receptacle connector is electrically insulated from the first receptacle connector.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1C illustrates the connector assembly of FIG. 1A with an example socket assembly included therein;

FIG. 2E illustrates another view of the receptacle assembly of FIG. 2A;

FIG. 3B illustrates another view of the receptacle housing of FIG. 3A;

FIG. 4B illustrates another example split receptacle connector that may be implemented in the receptacle assembly of FIG. 2A;

DESCRIPTION OF SOME EXAMPLE EMBODIMENTS

Figure 1A:
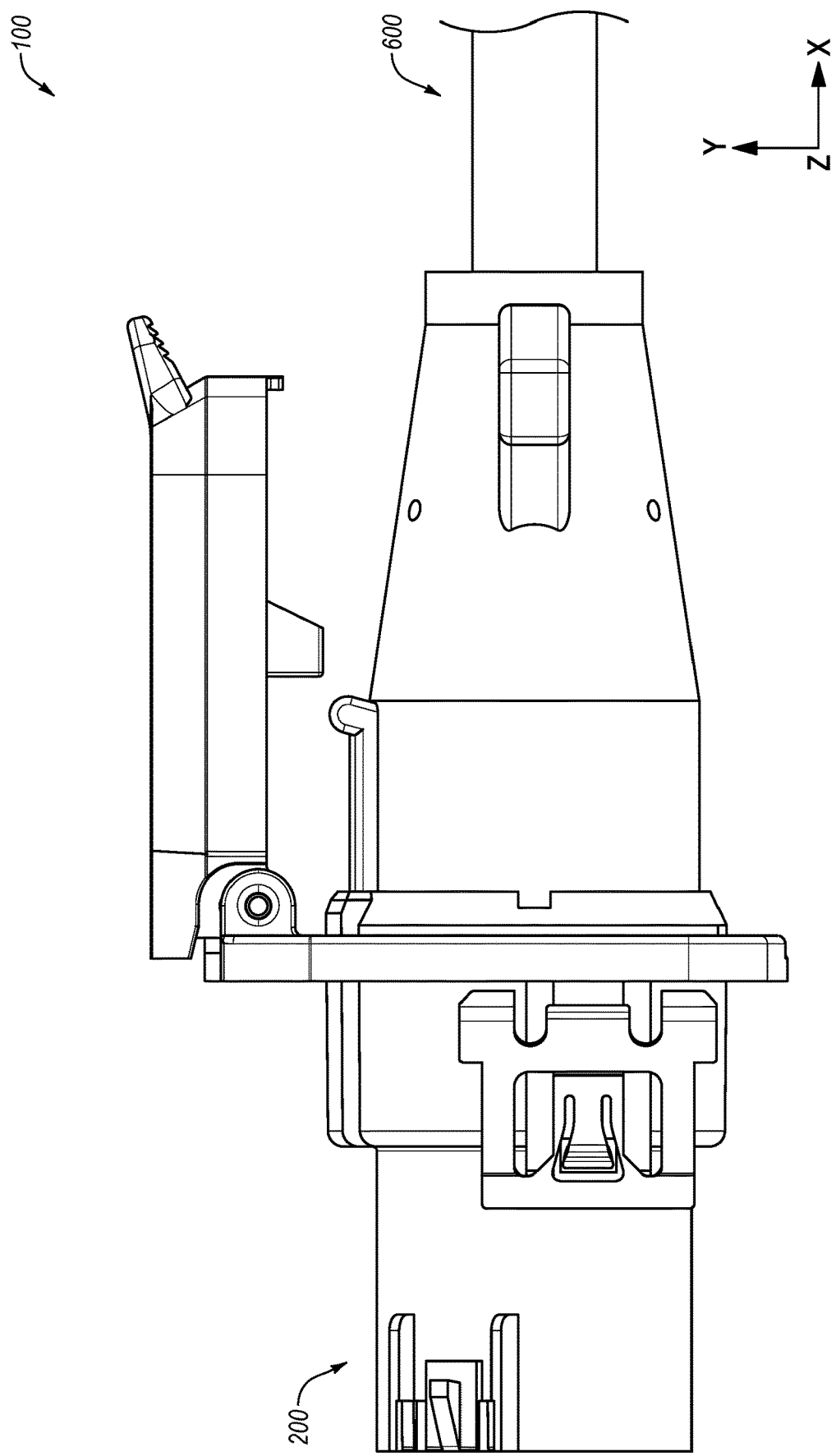
FIG. 1A illustrates an example vehicle-trailer wiring connector assembly (connector assembly)

Vehicle-trailer wiring connector assemblies (hereinafter, connector assemblies) may include a receptacle assembly that may be physically coupled to a tow vehicle and a plug assembly that may be physically coupled to a trailer. When towing and otherwise using the trailer, electrical signals may be communicated between the tow vehicle and the trailer via the connector assembly. For example, the receptacle assembly may be configured to be wired to one or more systems of the tow vehicle and may include electrical connectors that may be configured to be electrically connected to wires that may correspond to the one or more systems in that the wires may each be configured to carry electrical signals that may be used by one of the systems. Similarly, the plug assembly may be configured to be wired to one or more systems of the trailer and may include electrical connectors that may be configured to be electrically connected to wires that may also correspond to the one or more systems of the trailer. The plug assembly may be configured to be positioned within the receptacle assembly such that, when the plug assembly is positioned within the receptacle assembly, each of the electrical connectors included in the receptacle assembly are electrically connected to one of the electrical connectors of the plug assembly. Accordingly, when the plug assembly is positioned in the receptacle assembly, electrical signals may be communicated between systems of the tow vehicle and corresponding systems of the trailer via the electrical connections of the connector assembly. In the present disclosure, the term "electrical signals" may refer to any direct current (DC) or alternating current (AC) voltage or current, which may include voltages or currents supplied from a positive terminal of a power system (e.g., a positive terminal of a battery or a supply node of an alternator) and return currents that pass through a "neutral" or "ground" wire connected to a negative terminal of the power system (e.g., a negative terminal of the battery) or to a ground (e.g., the body of the vehicle) and associated voltages.

As tow vehicles and trailers become more complex, a number of systems that may communicate between the trailers and the tow vehicles may increase. For example, trailers may include a back-up camera, sonar systems, tire pressure monitoring systems, weight monitoring systems, alarm systems, etc., which drivers of the tow vehicles may wish to actuate or use.

Such advancement in trailers and tow vehicles may result in an increase in a number of electrical connectors in the plug assembly and the receptacle assembly. However, a tow vehicle with a receptacle assembly that includes an increased number of electrical connectors may not be readily compatible with trailers with plug assemblies that include fewer electrical connectors. Similarly, a trailer with a plug assembly that includes an increased number of electrical connector may not be readily compatible tow vehicles with receptacle assemblies that include fewer electrical connectors. The incompatibility of tow vehicles and trailers may be problematic for users. For example, a user may purchase a newer tow vehicle and a newer trailer between which thirteen or another suitable number of electrical signals are communicated. The user may additionally own an older trailer in which seven electrical signals may be communicated between the tow vehicle and the older trailer. In existing systems, the user may be forced to use multiple receptacle assemblies to use the newer trailer and the older trailer with the newer tow vehicle or the older tow vehicle.

Accordingly, some embodiments described in this disclosure may include a connector assembly that is configured to enable interface of plug assemblies and receptacle assemblies with different numbers of electrical connectors in multiple configurations. For example, in an example embodiment, the connector assembly may include a receptacle assembly. The receptacle assembly may include a receptacle housing that defines a first cavity. The first cavity may extend from a first end of the receptacle housing to a central structure of the receptacle housing. The housing opening may be defined at the first end. At least a portion of the first cavity and at least a portion of the housing opening may be sized and shaped to enable insertion of a plug assembly that is constructed to comply with the SAE J2863 standard. The receptacle assembly may include receptacle connectors which extend into the first cavity. The receptacle connectors may include a central electrical connector configured according to the SAE J2863 standard, six electrical connectors wired according to the SAE J2863 standard, and six additional electrical connectors. Each of the six additional electrical connectors may be grouped with one of the six electrical connectors. When the plug assembly, which is constructed according to the SAE J2863 standard, is positioned in the first cavity, each group of the additional electrical connectors and the six electrical connectors are received by a single female connector assembly of the plug assembly. When the plug assembly is a seven-way plug assembly, electrical signals may be communicated along the central electrical connector and the six electrical connectors. When the plug assembly is a thirteen-way plug assembly, electrical signals may be communicated along the central electrical connector, the six electrical connectors, and the six additional electrical connectors.

In another example embodiment, the connector assembly may include a plug assembly. The plug housing may be configured to be positioned in a receptacle assembly. The plug assembly may include six connector cavities that may be defined in the plug housing and may be radially disposed around a connecting face of the plug housing in a hexagonal arrangement in compliance with the SAE J2863 standard. The plug assembly may include plug connectors, six of which are wired according to the SAE J2863 standard, a central electrical connector, and six additional electrical connectors wired to one or more systems of a trailer not included in the SAE J2863 standard. Each of the six electrical connectors may be positioned in one of the connector cavities with one of the additional electrical connectors. The six electrical connectors may be displaced relative to the additional electrical connector in the connector cavities and electrically insulated therefrom. These and other embodiments are described with reference to the appended figures in which items labelled with the same item number indicate similar structure unless otherwise described.

In the present disclosure, reference to an assembly being configured according to the SAE J2863 standard may refer to the assembly being sized, shaped, constructed, wired, etc., or having one or more components that are sized, oriented, shaped, placed, constructed, wired, etc., such that the assembly provides a particular function according to the SAE J2863 standard. For example, reference to a plug assembly being configured according the SAE J2863 may indicate that the plug assembly has electrical connectors ("plug connectors") that are sized, shaped, oriented, placed, etc., such that they may be electrically connected with systems of a trailer included in the SAE J2863 standard and such that the plug connectors may interface with electrical connectors of a receptacle assembly ("receptacle connectors") that are also sized, shaped, oriented, placed, etc., according to the SAE J2863 standard.

Additionally, reference to a component of an assembly being configured according to the SAE J2863 standard may refer to the component being sized, oriented, shaped, placed, constructed, wired, etc., or having one or more sub-components that are sized, oriented, shaped, placed, constructed, wired, etc., such that the component provides a particular function according to the SAE J2863 standard. For example, reference to a receptacle connector being configured according to the SAE J2863 standard may indicate that the receptacle connector is sized, shaped, oriented, placed, etc., such that it may be inserted in a connector cavity of a plug assembly and contact a plug connector disposed in the connector cavity where the connector cavity and the plug connector are sized, shaped, oriented, placed, etc., according to the SAE J2863 standard. Similarly, reference to a connector cavity being configured according to the SAE J2863 standard may indicate that the connector cavity is sized, shaped, oriented, placed, etc. such that a corresponding receptacle connector may be inserted in the connector cavity. Further, reference to plug assemblies or receptacle assemblies being configured according to the SAE J2863 standard may indicate that each of the plug connectors or receptacle connectors may be assigned to correspond to a particular system depending on their placement and designation in the SAE J2863 standard.

In addition, reference to a particular component of a particular assembly (e.g., reference to a plug connector of a plug assembly) or reference to a particular sub-component of a component being configured according to the SAE J2863 standard does not require that the entire assembly or component is configured exactly according to the SAE J2863 standard. For example, a particular plug assembly may be described as including a plug connector configured according to the SAE J2863 standard but may also include one or more additional plug connectors that may not be part of the SAE J2863 standard.

Similarly, reference to a component (e.g., an electrical connector) corresponding to the SAE J2863 standard may indicate that the component provides a particular function that may be outlined by the SAE J2863 standard. For example, the SAE J2863 standard includes seven different electrical connectors for each plug and receptacle assembly where the seven electrical connectors are designated to provide electrical connections associated with the following systems or functions: (1) left turn/stop lights; (2) "−" or ground; (3) electric brakes; (4) right turn/stop lights; (5) "+" or power supply; (6) running lights; and (7) reverse lights. Therefore, reference to an electrical connector or electrical connectors corresponding to the SAE J2863 standard may indicate that the electrical connector or electrical connectors provide electrical connections that correspond to one of the seven systems or functions detailed in the SAE J2863 standard.

Additionally, reference to a component (e.g., an electrical connector) being outside of or in addition to the SAE J2863 standard may indicate that the component provides a function that may not be included in the SAE J2863 standard. For example, an electrical connector that provides electrical connections associated with systems or functions other than the seven listed above for the SAE J2863 standard may be referred to as being outside of or in addition to the SAE J2863 standard. Similarly, reference to a component corresponding to a system that is outside of or in addition to the SAE J2863 standard may indicate that the component provides a function for such systems that are not included in the SAE J2863 standard.

Also, reference to trailer or tow vehicle systems in the present disclosure may refer to any component or combination of components that may communicate electrical signals. In some embodiments, a system may be as simple as a wire, a series of wires, a light, a series of lights, etc., or as complex as a computer control system and related components configured to perform more sophisticated operations, or anything in-between. Some systems may be referred to as corresponding to the SAE J2863 standard and others may be referred to as being outside of or in addition to the SAE J2863 standard. Systems referred to as corresponding to the SAE J2863 standard may include those systems which have electrical connectors of connector assemblies designated thereto in the SAE J2863 standard. In addition, systems referred to as being outside of or in addition to the SAE J2863 standard may include those systems that may use electrical connections and electrical signals that are not included in the SAE J2863 standard.

For example, as indicated above, the SAE J2863 standard includes seven different electrical connectors for each plug and receptacle assembly, where each of the seven electrical connectors corresponds to one of the following: (1) left turn/brake lights; (2) "−" or ground; (3) electric brakes; (4) right turn/brake lights; (5) "+" or power supply; (6) running lights; and (7) reverse lights. Therefore, reference to systems that correspond to the SAE J2863 standard may include power systems that provide power to vehicular components; braking systems that use or provide electrical power to apply brakes; lighting systems that use or provide electrical signals corresponding to lights such as brake lights, turn signals, flashing hazard lights, running lights, reverse lights, etc.; and grounding systems that provide a grounding or return function for the electrical signals and other systems. As another example, some systems such as back-up cameras, sonar systems, tire pressure monitoring systems, weight monitoring systems, alarm systems, etc. may require the use of one or more electrical connectors different from the seven electrical connectors included in the SAE J2863 standard. Therefore, these systems may be referred to as being outside of or in addition to the SAE J2863 standard.

In addition, some systems referred to as corresponding to the SAE J2863 standard may be electrically connected to one or more of the seven electrical connectors designated according to the SAE J2863 standard. Additionally or alternatively, some systems referred to as being outside of or in addition to the SAE J2863 standard may also be electrically connected to one or more of the seven electrical connectors designated according to the SAE J2863 standard, but may also require the use of one or more other electrical connectors and corresponding electrical signals.

Moreover, reference to a plug connector corresponding to a receptacle connector or vice versa may indicate that the plug connector and the corresponding receptacle connector are configured to be electrically connected to each other when the plug assembly of which the plug connector is included is inserted into the receptacle assembly of which the receptacle connector is included. Further, reference to a component (e.g., a plug connector, a receptacle connector, a wire, etc.) corresponding to a system may indicate that the component is configured to provide electrical connections that may be used by the corresponding system.

Figure 1B:
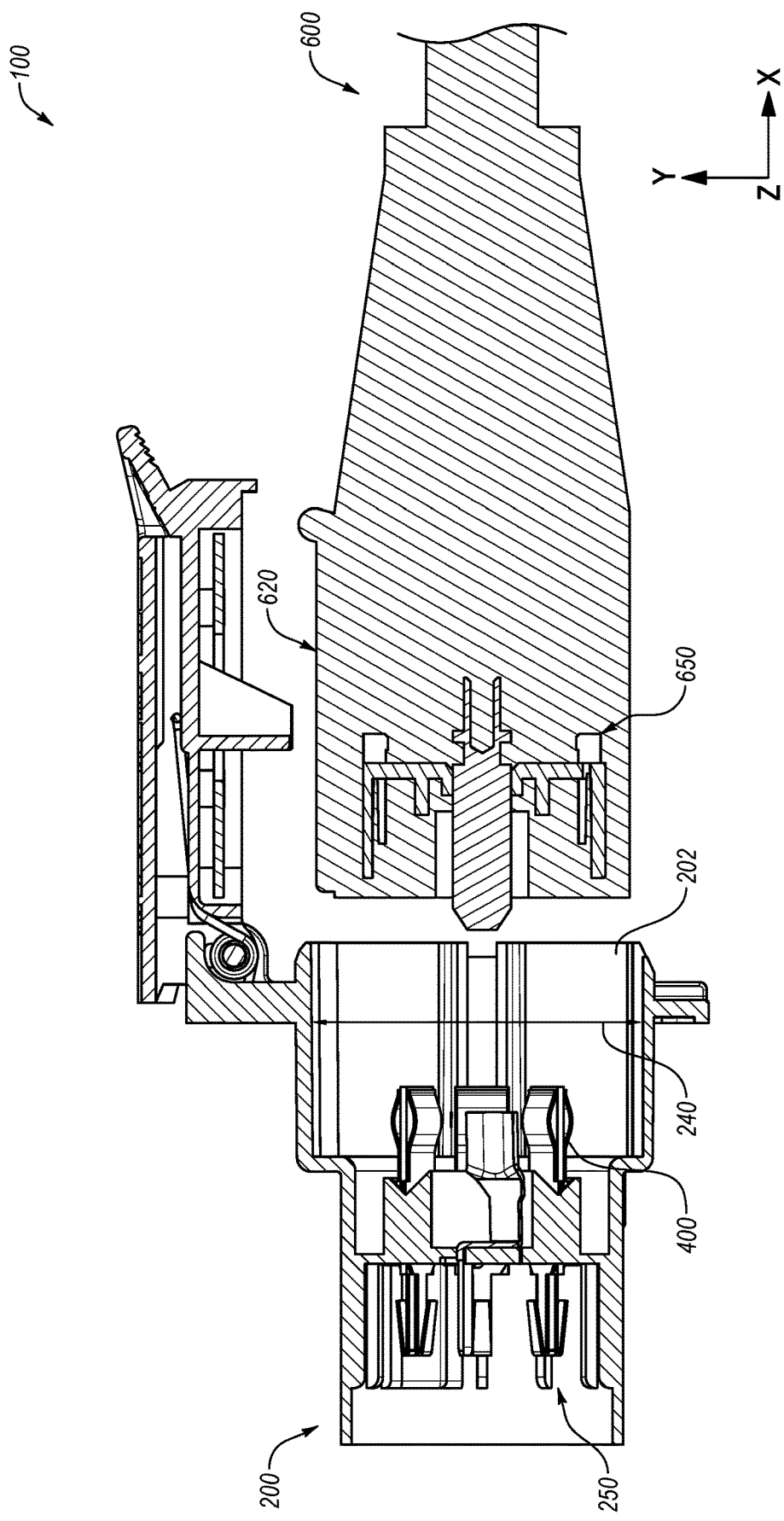
FIG. 1B illustrates the connector assembly of FIG. 1A in another configuration.

FIGS. 1A and 1B illustrate an example vehicle-trailer wiring connector assembly (connector assembly) 100 according to some embodiments described in this disclosure. The connector assembly 100 may include a plug assembly 600 and a receptacle assembly 200. FIG. 1A depicts an external view of the plug assembly 600 with a portion thereof positioned in the receptacle assembly 200. FIG. 1B depicts a sectional view of the connector assembly with the plug assembly 600 withdrawn from the receptacle assembly 200.

The connector assembly 100 is generally configured for communication of electrical signals between a tow vehicle and a trailer. For example, one or more systems of the tow vehicle may be electrically connected to receptacle connectors 250 of the receptacle assembly 200. One or more systems of the trailer may be electrically connected to plug connectors 650 of the plug assembly 600. The plug assembly 600 and the receptacle assembly 200 may be configured such that when a portion of the plug assembly 600 is positioned in the receptacle assembly 200 as in FIG. 1A, the receptacle connectors 250 contact the plug connectors 650, which may enable communication of electrical signals from a particular system of the tow vehicle through one or more of the receptacle connectors 250, through corresponding plug connectors 650, and to a corresponding system of the trailer. Additionally, the plug assembly 600 and the receptacle assembly 200 may be configured such that when the plug assembly 600 is withdrawn from the receptacle assembly 200 as in FIG. 1B, the receptacle connectors 250 are electrically disconnected from the plug connectors 650.

In the embodiments of FIGS. 1A and 1B, portions of the plug assembly 600 and the receptacle assembly 200 may be constructed according to the SAE J2863 standard. Construction of portions according to the SAE J2863 standard may enable use of the receptacle assembly 200 with the plug assembly 600 of FIGS. 1A and 1B as well as with other plug assemblies that are constructed according to the SAE J2863 standard. For instance, with reference to FIG. 1B, the receptacle assembly 200 may include a first cavity 202 that includes a diameter 240 that is sized to enable insertion of the plug assembly 600 of FIGS. 1A and 1B as well as any other plug assembly that is sized according to the SAE J2863 standard.

In addition, the receptacle connectors 250 may be configured to enable use with the plug assembly 600 of FIGS. 1A and 1B as well as any other plug assembly that is configured according to the SAE J2863 standard. For example, one or more of the receptacle connectors 250 may include one or more split receptacle connectors 400. A first receptacle connector of the split receptacle connector 400 may correspond to the SAE J2863 standard in that it may be configured (e.g., sized, placed, shaped, oriented, etc.) to interface with a corresponding plug connector of a plug assembly configured according to the SAE J2863 standard. In addition, the split receptacle connector 400 may include one or more second receptacle connectors configured to interface with one or more corresponding additional plug connectors of another plug assembly (e.g., the plug assembly 600) where the additional plug connectors may not be part of the SAE J2863 standard.

The plug assembly 600 may be configured such that when the portion of the plug assembly 600 is positioned in the receptacle assembly 200, the first receptacle connector and the one or more second receptacle connectors of the split receptacle connector 400 may each contact one of the plug connectors 650. The receptacle assembly 200 may also be configured such that when another plug assembly that is constructed and wired according to the SAE J2863 standard is positioned in the receptacle assembly 200, the first receptacle connector of the split receptacle connector 400 contacts one of the plug connectors of the plug assembly. However, the plug assembly that is wired according to the SAE J2863 standard may not include a plug connector that corresponds to the one or more second connectors of the split receptacle connector 400. Accordingly, any signals that may be communicated along the one or more second receptacle connectors may not be communicated to the plug assembly that is configured according to the SAE J2863 standard.

Such construction enables use of the receptacle assembly 200 with trailers that include the plug assembly 600 as well as the other plug assemblies configured according to the SAE J2863 standard. For example, a user may own a single tow vehicle such as a pick-up truck and may also own an equipment trailer and a camping trailer with some updated electrical systems. The tow vehicle may have the receptacle assembly 200 of FIGS. 1A and 1B physically and electrically connected thereto. The equipment trailer may have a 7-way plug assembly configured according to the SAE J2863 standard physically and electrically connected thereto. The camping trailer may have the plug assembly 600 physically and electrically connected thereto. The user may be able to position the 7-way plug assembly of the equipment trailer in the receptacle assembly 200. Electrical signals that originate at the tow vehicle may be communicated to a subset of the receptacle connectors 250 that may be configured according to the SAE J2863 standard in that the receptacle connectors 250 may contact the plug connectors of the 7-way plug assembly. The user may also be able to position the plug assembly 600 in the receptacle assembly 200. Electrical signals may be communicated between the tow vehicle and the camping trailer via the subset of the receptacle connectors 250 configured according to the SAE J2863 standard as well as via one or more second receptacle connectors included in the receptacle connectors 250 and the plug connectors 650 that are outside of the SAE J2863 standard.

In addition, the plug connectors 650 may be configured to enable the plug assembly to be used with the receptacle assembly 200 as well as any other receptacle assembly that is configured according to the SAE J2863 standard. For example, the plug connectors 650 may include one or more first plug connectors that may be configured according to the SAE J2863 standard. The plug connectors 650 may also include one or more second plug connectors that may be outside of the SAE J2863 standard. In some embodiments, a particular first plug connector and one or more second plug connectors may be disposed or positioned in a same one of multiple connector cavities defined in the plug housing 620. As discussed in further detail below, the plug assembly 600 may be configured such that when the portion of the plug assembly 600 is positioned in the receptacle assembly 200, the first plug connectors and the second plug connectors of the plug connectors 650 each contact one of the receptacle connectors 250. Additionally, as discussed in further detail below, the plug assembly 600 may be configured such that when the portion of the plug assembly 600 is positioned in another receptacle assembly that is configured according to the SAE J2863 standard, each of the one or more first plug connectors of the plug connectors 250 contact one of the receptacle connectors of the other receptacle assembly. However, as detailed elsewhere in this disclosure, in some embodiments, the plug assembly 600 may also be configured such that electrical connections that may be provided by the second plug connectors of the plug connectors 650 with respect to corresponding systems of a trailer may be disconnected to prevent transmission of electrical signals along the second connectors to and/or from the corresponding systems of the trailer.

Such construction may enable use of the plug assembly 600 with tow vehicles that include the receptacle assembly 200 as well as other receptacle assemblies configured according to the SAE J2863 standard. For example, a user may own two tow vehicles; one with a 7-way receptacle assembly configured according to the SAE J2863 standard, and another with the receptacle assembly 200. The user may also own a camping trailer with the plug assembly 600. In some embodiments, the plug assembly 600 may be configured such that when the camping trailer is towed by the tow vehicle with the 7-way receptacle assembly, the first plug connectors may be electrically connected with the receptacle connectors of the 7-way receptacle assembly and the second plug connectors may be disconnected or otherwise configured to prevent communication of electrical signals. When the camping trailer is towed by the tow vehicle with the receptacle assembly 200, electrical signals may be communicated along the first plug connectors that correspond to the SAE J2863 standard and the second plug connectors that do not correspond to the SAE J2863.

In the illustrated embodiments of FIGS. 1A and 1B, the plug connectors 650 of the plug assembly 600 and the receptacle connectors 250 of the receptacle assembly 200 each include thirteen electrical connectors. Seven of the thirteen electrical connectors may correspond to the SAE J2863 standard. For instance, six electrical connectors and a central electrical connector may be configured according to the SAE J2863 standard such that they may correspond to the 7 systems or functions of the SAE J2863 standard described above. In addition, six of the thirteen electrical connectors may be wired to communicate electrical signals that are outside of or in addition to the SAE J2863 standard. For example, seven of the connectors in the plug connectors 650 and the receptacle connectors 250 may be configured to provide electrical connections associated with (1) left turn/stop lights; (2) "−" or ground; (3) electric brakes; (4) right turn/stop lights; (5) "+" or power supply; (6) running lights; and (7) reverse lights. The other six connectors may be configured to provide electrical connections that may relate to an accessory or system that is outside of or in addition to the SAE J2863 standard.

In some embodiments, the receptacle connectors 250 and/or the plug connector 650 may include fewer than thirteen electrical connectors or more than thirteen electrical connectors. For example, the receptacle connectors 250 and/or the plug connector 650 may each include between eight and twelve connectors. In these embodiments, seven of the connectors may correspond to the SAE J2863 standard and one or more additional connectors may be outside of or in addition to the SAE J2863 standard. In other embodiments that include more than thirteen connectors, seven of the connectors may correspond to the SAE J2863 standard, while six or more additional connectors may be outside of or in addition to the SAE J2863 standard. Moreover, in some embodiments, the receptacle connectors 250 and/or the plug connectors 650 may not include seven connectors that are configured according to the SAE J2863 standard. Instead, in these and other embodiments, fewer than seven of the connectors may be configured according to the SAE J2863 standard, which may enable communication of additional electrical signals associated with systems that are outside of or in addition to the SAE J2863 standard.

Figure 1D:
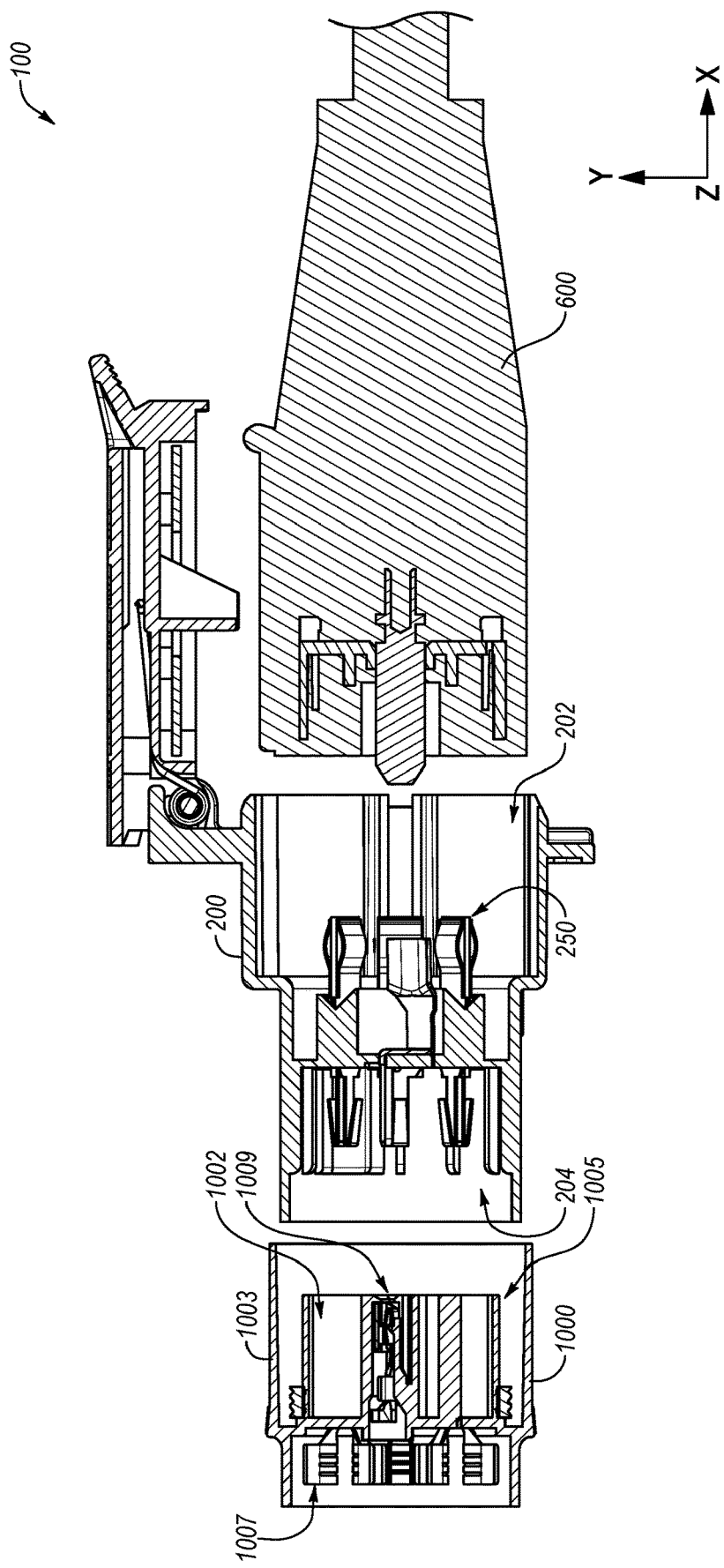
FIG. 1D illustrates the connector assembly of FIG. 1C in another configuration.

FIGS. 1C and 1D illustrate an example embodiment of the connector assembly 100 that includes the receptacle assembly 200, the plug assembly 600, as well as a socket assembly 1000. FIG. 1C depicts the plug assembly 600 positioned in the first cavity 202 of the receptacle assembly 200 and the socket assembly 1000 positioned around a second cavity 204 of the receptacle assembly 200 with a portion of the socket assembly 1000 positioned in the second cavity 204. FIG. 1D depicts the plug assembly 600, the receptacle assembly 200, and the socket assembly 1000 exploded from one another.

The socket assembly 1000 may include socket connectors 1002. A first portion 1007 of one or more of the socket connectors 1002 may be electrically connected to wires, which may be electrically connected to one or more systems of a tow vehicle. A second portion 1009 of the socket connectors 1002 may be configured to contact the receptacle connectors 250 when an insertion portion 1005 of a socket housing 1003 is positioned within the second cavity 204 of the receptacle assembly 200.

One or more of the socket connectors 1002 may be electrically connected via a wire to one or more systems as specified in the SAE J2863 standard. In addition, one or more of the socket connectors 1002 may be electrically connected to a wire that is also connected to a system that is not included in the SAE J2863 standard.

Accordingly, when the socket assembly 1000 is engaged with the receptacle assembly 200 as depicted in FIG. 1C, electrical signals may be communicated from one or more systems of the tow vehicle through wires and to the first portion 1007 of the socket connectors 1002. The electrical signals may be communicated to one or more of the receptacle connectors 250 by the second portion 1009 of the socket connectors 1002. Modifications, omissions, and/or changes may be made to one or more of the embodiments illustrated in FIGS. 1A-1D without departing from the scope of the disclosure.

In the following paragraphs the receptacle assembly 200 is described with reference to FIGS. 2A-5. The plug assembly 600 is described with reference to FIGS. 6A-9B. The socket assembly 1000 is described with reference to FIGS. 10A and 10B. FIG. 11 is an example wiring diagram that may be implemented in the connector assembly 100.

Figure 2A:
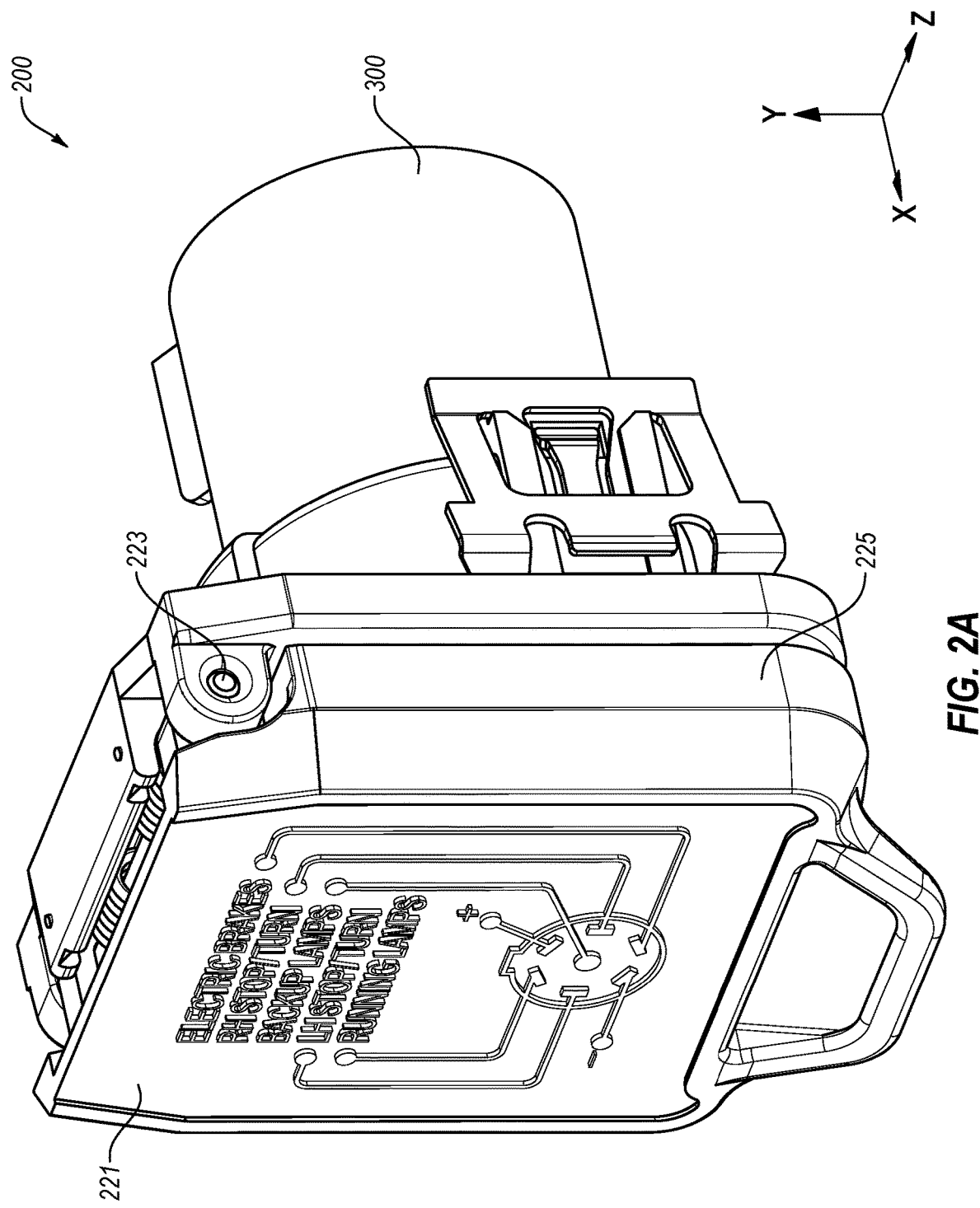
FIG. 2A illustrates an example receptacle assembly that may be implemented in the connector assemblies of FIGS. 1A-1D.
Figure 2B:
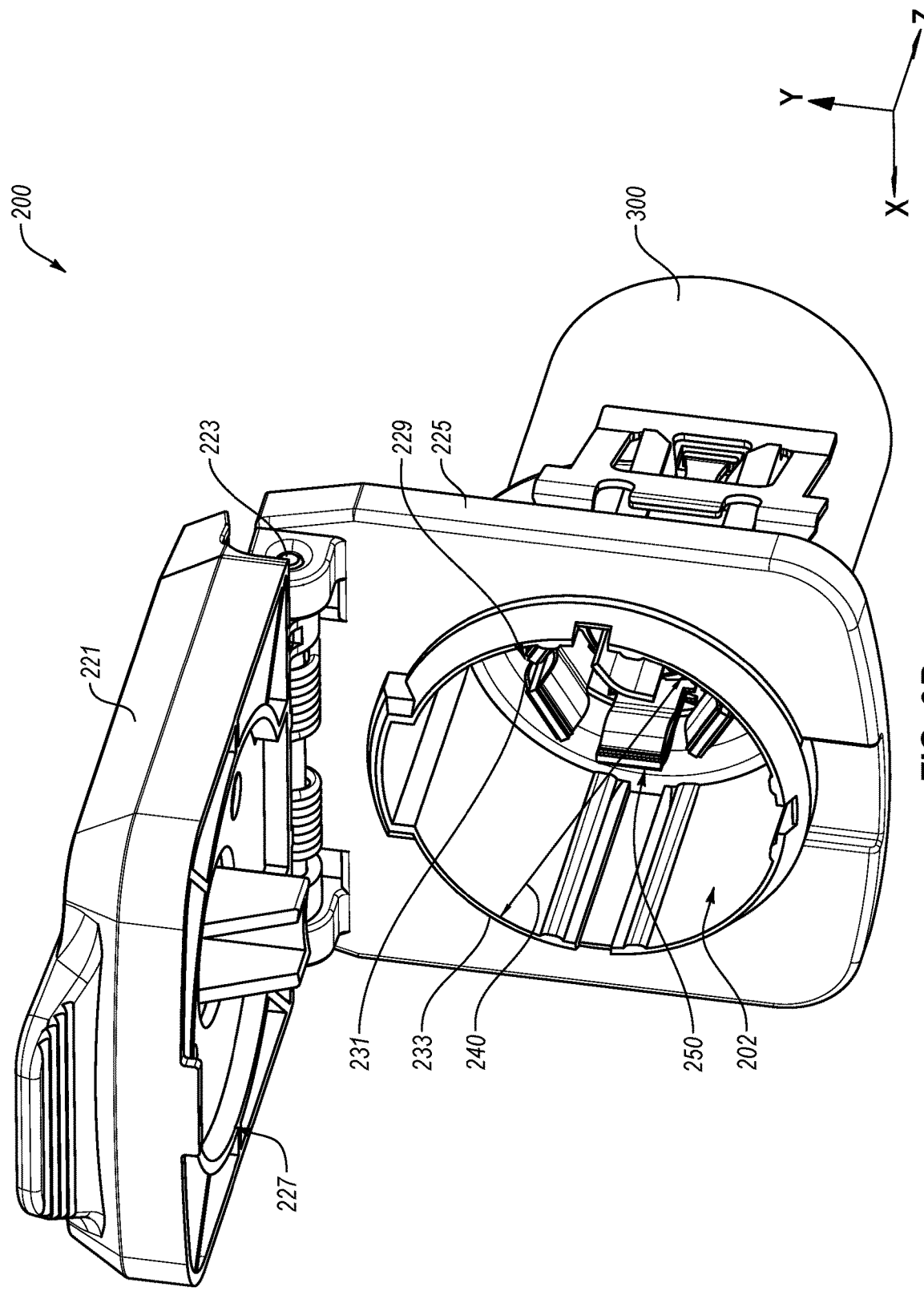
FIG. 2B illustrates another view of the receptacle assembly of FIG. 2A.
Figure 2C:
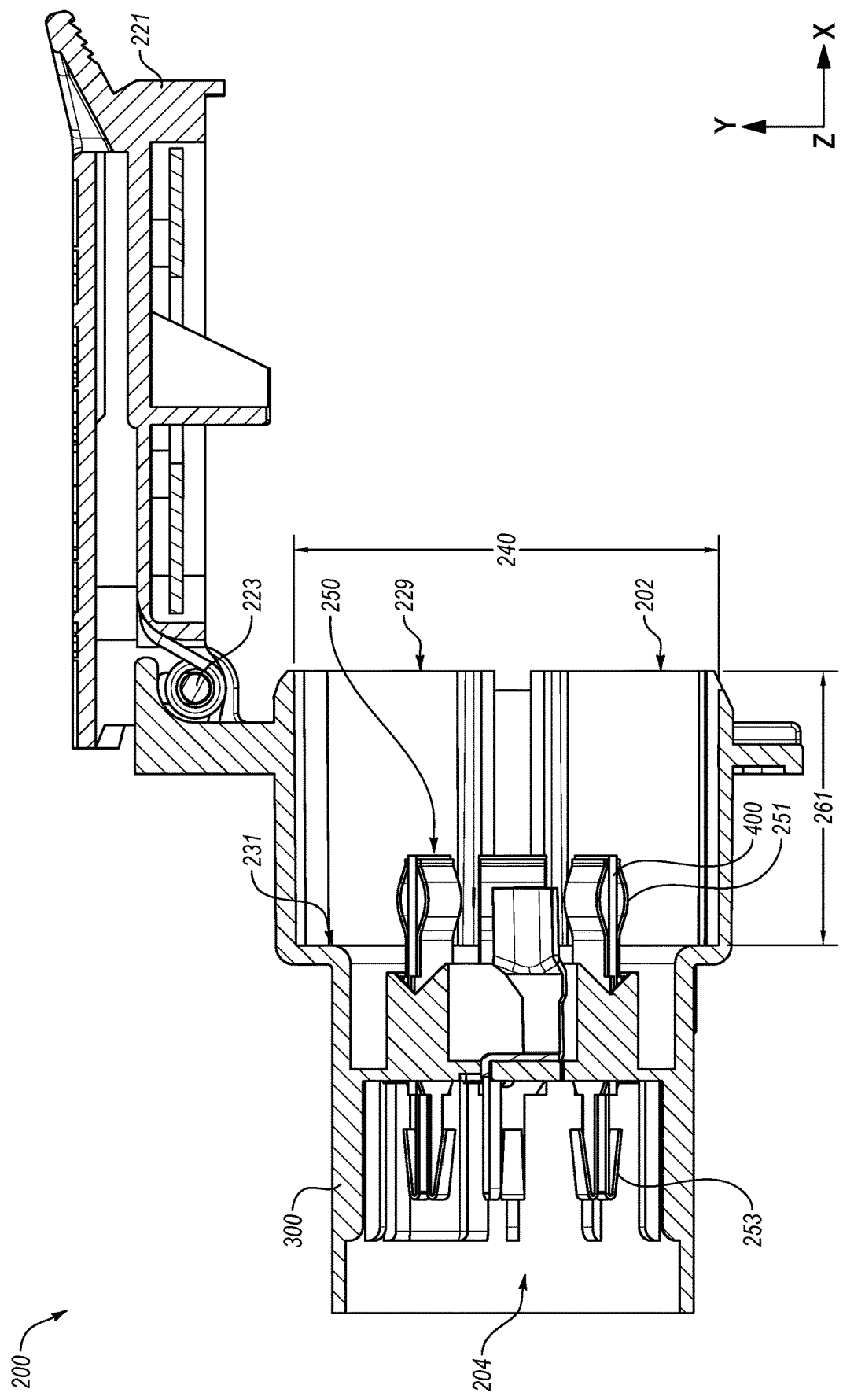
FIG. 2C illustrates another view of the receptacle assembly of FIG. 2A.
Figure 2D:
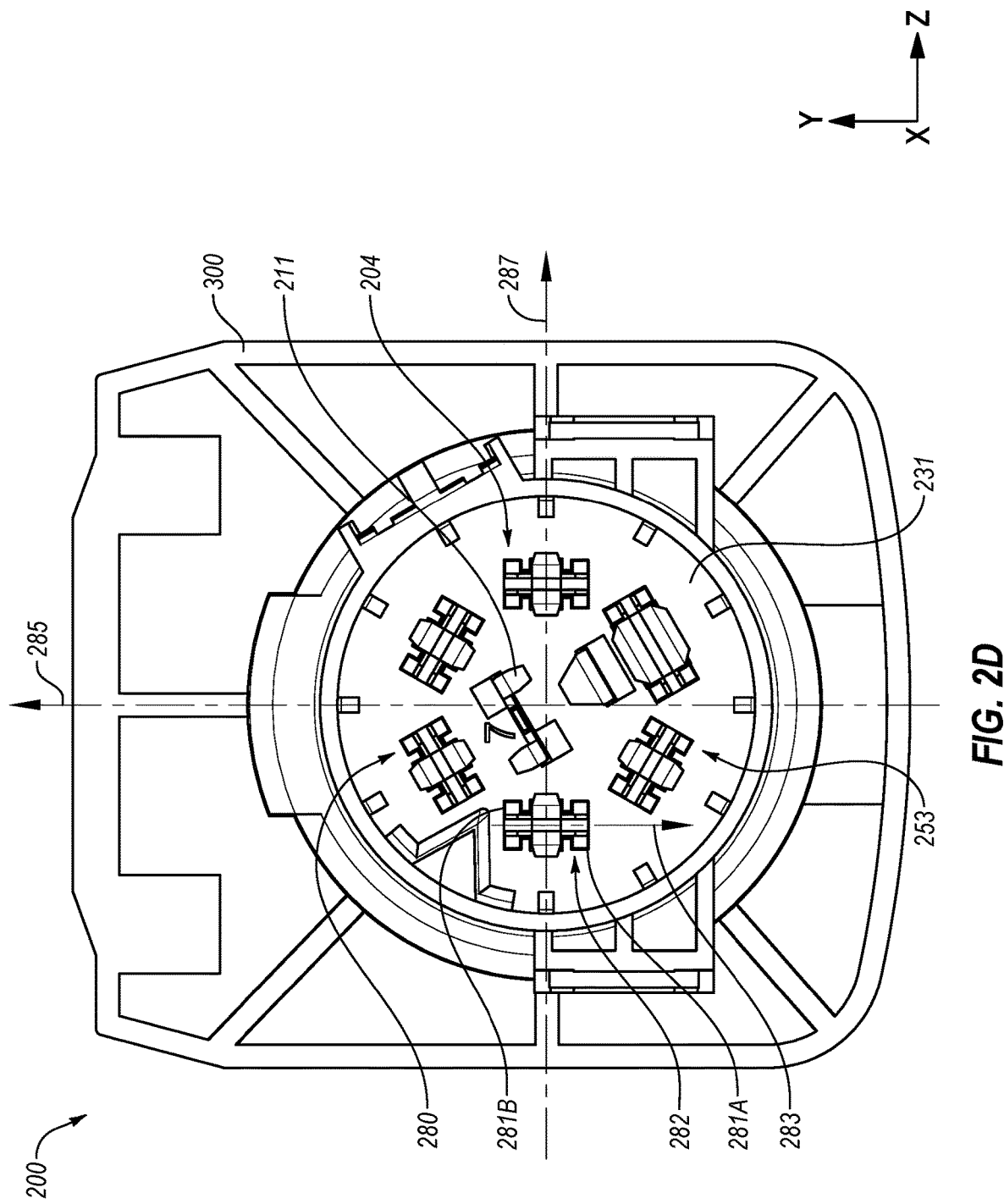
FIG. 2D illustrates another view of the receptacle assembly of FIG. 2A.
Figure 2F:
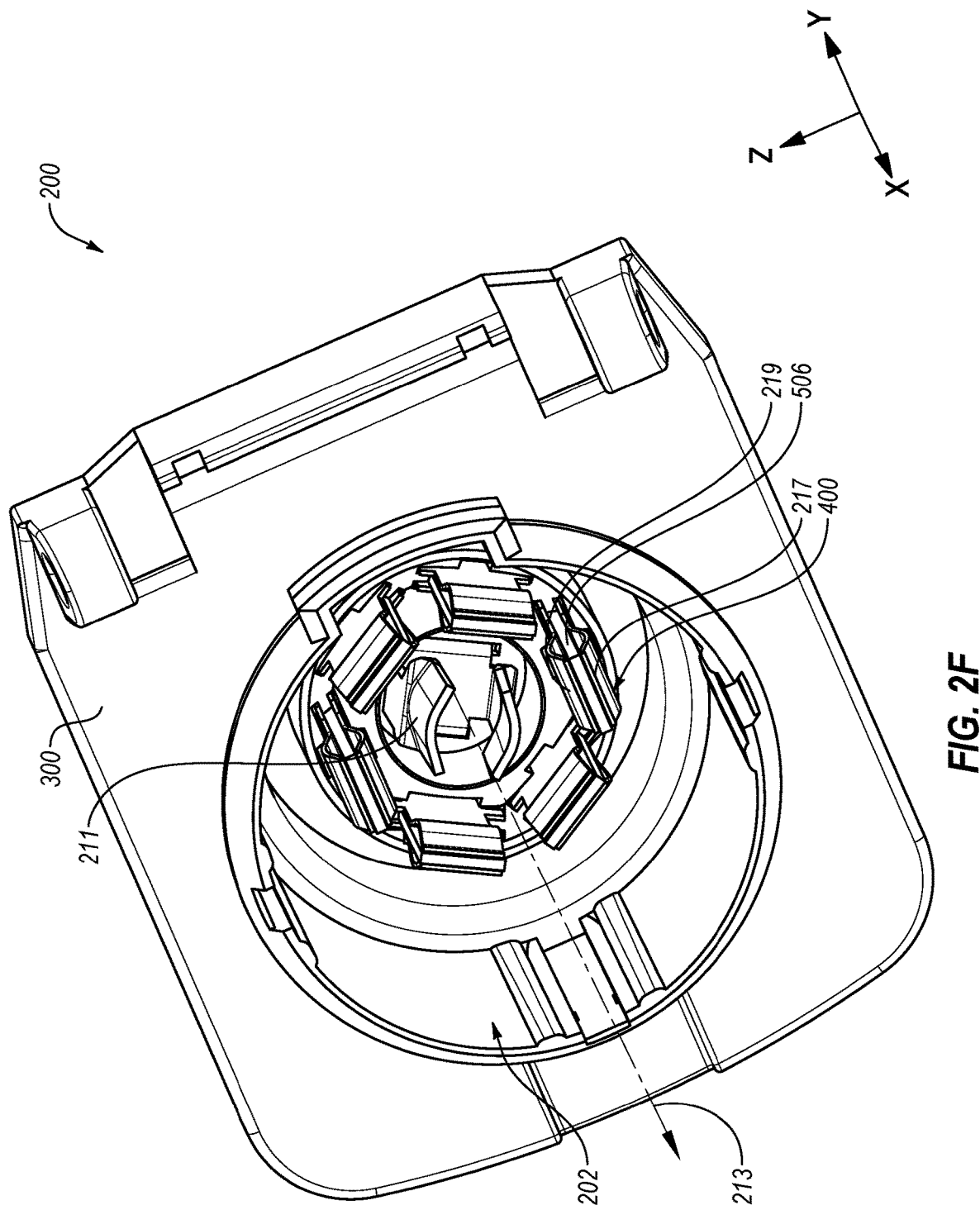
FIG. 2F illustrates another view of the receptacle assembly of FIG. 2A.

FIGS. 2A-2F illustrate an example embodiment of the receptacle assembly 200 that may be implemented in the connector assembly 100 of FIGS. 1A-1D, according to one or more embodiments of the present disclosure. FIG. 2A depicts a perspective view of the receptacle assembly 200. In FIG. 2A, the receptacle assembly 200 is depicted with a receptacle door 221 that is in a closed position relative to a receptacle housing 300 of the receptacle assembly 200. FIG. 2B depicts another perspective view of the receptacle assembly 200. In FIG. 2B, the receptacle door 221 is configured in an open position relative to the receptacle housing 300. FIG. 2C depicts a sectional view of the receptacle assembly 200. FIG. 2D depicts a rear planar view of the receptacle assembly 200. FIG. 2E depicts a front planar view of the receptacle assembly 200. FIG. 2F depicts another perspective view of the receptacle assembly 200 with the receptacle door 221 removed.

The receptacle assembly 200 includes the receptacle connectors 250 disposed in the receptacle housing 300. In some embodiments, the receptacle connectors 250 may be constructed of a metal such as copper, steal, zinc, combinations thereof, or another electrically conductive material. In some embodiments, the receptacle housing 300 may be constructed of a plastic in which the receptacle connectors 250 are positioned. In some embodiments, the receptacle housing 300 may be constructed of a metal or another material. In these and other embodiments, the receptacle connectors 250 may be fixed to the receptacle housing 300. For example, the receptacle connectors 250 may be soldered or epoxied to the receptacle housing 300.

With reference to FIGS. 2A and 2B, the receptacle assembly 200 includes the receptacle door 221 and the receptacle housing 300. The receptacle door 221 may rotate relative to the receptacle housing 300 about a hinge 223. The receptacle door 221 may be positioned in an open position as depicted in FIG. 2A and in a closed position as depicted in FIG. 2B. The hinge 223 may be configured to maintain the receptacle door 221 in the closed position. In the closed position of FIG. 2A, the receptacle connectors 250 may not be accessible and may be protected from ambient conditions such as rain and mud. For example, the receptacle door 221 may be sealed or substantially seal relative to a flange portion 225 of the receptacle housing 300. When closed, the receptacle door 221 may prevent introduction of a plug assembly, such as the plug assembly 600 of FIGS. 1A and 1B into the receptacle housing 300. The receptacle door 221 may be in the closed position between uses, for instance.

With reference to FIG. 2B, the receptacle assembly 200 may include the receptacle housing 300. The receptacle housing 300 may define the first cavity 202. The first cavity 202 may be substantially cylindrical and may include a first end 233. The first cavity 202 may extend from a central structure 231 to the first end 233, at which a housing opening 229 is defined. The first cavity 202 is configured to enable insertion of a plug assembly such as the plug assembly 600 of FIGS. 1A and 1B and/or other plug assemblies configured according to the SAE J2863 standard. For example, the first cavity 202 and/or the housing opening 229 may include a diameter 240 that is sized to receive a plug assembly that is constructed according to the SAE J2863 standard. An example of the diameter 240 may be between about four centimeters (cm) and about 4.5 cm, such as 4.25 cm, for example.

In the open position of FIG. 2B, a sealing surface 227 of the receptacle door 221 is separated from the flange portion 225 of the receptacle housing 300. In the open position of FIG. 2B, the first cavity 202 defined by the receptacle housing 300 is uncovered and the receptacle connectors 250 are accessible. Accordingly, a plug assembly such as the plug assembly 600 of FIGS. 1A and 1B and/or another plug assembly constructed according to the SAE J2863 standard may be positioned in the first cavity 202. In general, the receptacle door 221 is in the open position of FIG. 2B when a plug assembly is positioned in the first cavity 202 of the receptacle assembly 200.

The embodiments of FIGS. 2A and 2B include the receptacle door 221 and the flange portion 225. Some embodiments of the receptacle assembly 200 may not include the receptacle door 221 and/or the flange portion 225. For instance, the receptacle housing 300 may remain in a configuration in which the first cavity 202 is uncovered. Alternatively, the receptacle housing 300 may include the receptacle door 221, which may seal or substantially seal against the first end 233 of the first cavity 202.

With reference to FIG. 2C, the receptacle assembly 200 may include the receptacle connectors 250. First portions 251 of the receptacle connectors 250 may extend from the central structure 231 of the receptacle housing 300 into the first cavity 202. The receptacle connectors 250 are configured to be electrically connected to systems of a tow vehicle and to be engaged with and contact plug connectors when a plug assembly is positioned in the first cavity 202. For example, the first portions 251 of the receptacle connectors 250 that extend into the first cavity 202 are configured to be engaged with and contact the plug connectors of a plug assembly.

The receptacle connectors 250 may also include second portions 253. The second portions 253 of the receptacle connectors 250 are configured to be electrically connected to one or more systems of the tow vehicle. The second portions 253 of the receptacle connectors 250 may extend into a second cavity 204. The second cavity 204 is defined by the receptacle housing 300 and may extend from the central structure 231 in a direction away from the housing opening 229. For example, in FIG. 2C, the second cavity 204 may extend in an arbitrarily defined negative x-direction of FIG. 2C. In some embodiments, the receptacle connectors 250 may be indirectly electrically connected to the one or more systems of the tow vehicle. For instance, in these and other embodiments, the second portions 253 may be received in a vehicle plug assembly that is received in the second cavity 204.

Referring to FIGS. 2C and 2D, the second portions 253 of the receptacle connectors 250 are shown. The second portions 253 of the embodiment of FIGS. 2C and 2D may be male connectors. For example, the second portions 253 may be configured to be received in one or more female electrical connectors or female connector assemblies, which may be included in a vehicle plug assembly that is configured to be positioned in the second cavity 204. The second portions 253 and the receptacle connectors 250 may penetrate the central structure 231 of the receptacle housing 300 such that the second portions 253 extend into the second cavity 204 and the first portions 251 extend into the first cavity 202.

The second portions 253 of one or more of the receptacle connectors 250 may include a male electrical connector. For example, one or more of the second portions 253 may be configured to be received in a female electrical connector, which may be included in a socket assembly (e.g., the socket assembly 1000) that is configured to be positioned in the second cavity 204 as described elsewhere in this disclosure.

In some embodiments, the second portions 253 of one or more of the receptacle connectors 250 may include a female electrical connector. For example, one or more of the second portions 253 may be configured to receive a male electrical connector, which may be included in a vehicle plug assembly that is configured to be positioned in the second cavity 204.

The central structure 231 may retain the second portions 253 of the receptacle connectors 250 in an example rear receptacle arrangement 280 (depicted in FIG. 2D). In the example rear receptacle arrangement 280 of FIG. 2D, the connectors of the receptacle connectors 250 other than the central receptacle connector 211 are grouped with one or more other of the connectors of the receptacle connectors 250. For instance, in the depicted embodiment, the connectors of the receptacle connectors 250 other than the central receptacle connector 211 are grouped with one other of the connectors of the receptacle connectors 250, which are referred to as grouped connectors 282. One of the grouped connectors 282 is labeled in FIG. 2D.

The electrical connectors of the grouped connectors 282 may be substantially parallel to one another and/or may be oriented substantially symmetric with one another. For instance, first grouped connectors 282 may include a first connector 281A and a second connector 281B. The first connector 281A may be substantially parallel to the second connector 281B. In addition, the first connector 281A may be oriented substantially symmetric to the second connector 281B across an axis 283. The axis 283 may be positioned between the first connector 281A and the second connector 281B. In addition, the first connector 281A may be electrically insulated from the second connector 281B.

In the rear receptacle arrangement 280, six of the grouped connectors 282 are distributed circumferentially around the central receptacle connector 211. For example, in the embodiment of FIG. 2D, the grouped connectors are positioned about every 60 degrees around the central receptacle connector 211. In other embodiments, one or more of the grouped connectors 282 may be space more than 60 degrees or less than 60 degrees from other grouped connectors 282.

Additionally, the distribution of the grouped connectors 282 may be oriented relative to a first axis 285 and a second axis 287. The first axis 285 may be substantially perpendicular to the second axis 287. The first axis 285 and the second axis 287 may substantially bisect the second cavity 204.

In the embodiment of FIG. 2D, two of the grouped connectors 282 may be positioned along the second axis 287, one of which may be radially displaced in the x-direction or only in the x-direction from the other with respect to the illustrated x-axis. The second axis 287 may bisect the grouped connectors 282 positioned on the second axis 287. Additionally or alternatively, four of the grouped connectors 282 may be positioned ±30 degrees from the first axis 285 and ±60 degrees from the second axis 287. Additionally, none of the grouped connectors 282 are positioned on the first axis 285 in the illustrated embodiment.

With reference to FIGS. 2E and 2F, the receptacle connectors 250 may include one or more of the split receptacle connectors 400 mentioned above. In the example embodiment of FIGS. 2E and 2F, the receptacle assembly 200 may include six split receptacle connectors 400, only one of which is labelled. The split receptacle connectors 400 may each include a first receptacle connector that corresponds to the SAE J2863 standard and one or more second receptacle connectors that are in addition to or outside of the SAE J2863 standard. The first receptacle and the one or more second receptacle connectors may be grouped as the split receptacle connector 400. The split receptacle connector 400, which includes the first receptacle connector and the second receptacle connectors, may be configured to be received in a connector cavity of a single female connector assembly of the plug assembly, such as the plug assembly 600 of FIGS. 1A and 1B or another plug assembly constructed according to the SAE J2863 standard.

In addition, the receptacle connectors 250 may include a central receptacle connector 211. The central receptacle connector 211 may be aligned substantially parallel to a central axis 213 (FIG. 2F) of the receptacle housing 300. In the SAE J2863, the central receptacle connector 211 may be configured to communicate electrical signals associated with the reverse lights. In some embodiments of the receptacle assembly 200, the central receptacle connector 211 may be split or include multiple connectors that communicate the reverse light as well as one or more other electrical signals.

The split receptacle connectors 400 may be radially displaced from the central receptacle connector 211 and positioned circumferentially around the central receptacle connector 211. The split receptacle connectors 400 may be generally configured in a hexagonal arrangement 215 (FIG. 2E) that may be arranged according to the SAE J2863 standard.

One or more of the split receptacle connectors 400 may form a male connector. The male connector may be configured to be received in a female connector assembly of the plug assembly such as the plug assembly 600 of FIGS. 1A and 1B when the plug assembly is positioned in the first cavity 202. One or more of the split receptacle connectors 400 may include a first receptacle connector 217 and a second receptacle connector 219. The first receptacle connector 217 is separated from the second receptacle connector 219 by an insulator tab 506. The insulator tab 506 electrically insulates the first receptacle connector 217 from the second receptacle connector 219.

In some embodiments, the first receptacle connector 217 or the second receptacle connector 219 may correspond to the SAE J2863 standard. In addition, the central receptacle connector 211 may correspond to the SAE J2863 standard. In these and other embodiments, the other of the first receptacle connector 217 or the second receptacle connector 219 may correspond to the wiring of systems outside of the SAE J2863 standard and the corresponding communication of electrical signals associated with those systems. Accordingly, the example receptacle assembly 200 may be configured to provide electrical connections that correspond to the SAE J2863 standard as well as six additional electrical connections.

The six split receptacle connectors 400 may each provide at least two distinct and electrically insulated electrical connections and may each be configured to fit in a connector cavity of a female connector assembly of the plug assembly 600. Additionally, the six split receptacle connectors 400 may each be configured to fit in a connector cavity of another plug assembly configured according to the SAE J2863 standard. Accordingly, in some embodiments, when the plug assembly 600 of FIGS. 1A and 1B is positioned in the first cavity 202 of the receptacle assembly 200, each of the first receptacle connectors 217 and each of the second receptacle connectors 219 of the split receptacle connectors 400 may be in contact with one and only one of the plug connectors 650. In addition, in some embodiments, the receptacle assembly 200 may be configured such that when another plug assembly constructed according to the SAE J2863 standard is positioned in the first cavity 202, the central receptacle connector 211 and the first receptacle connectors 217 of each of the split receptacle connectors 400 may be configured such that the first receptacle connectors 217 contact the plug connectors included in the corresponding connector cavity of the other plug constructed according to the SAE J2863 standard. Additionally or alternatively, the receptacle assembly 200 may also be configured such that when another plug assembly constructed according to the SAE J2863 standard is positioned in the first cavity 202, the second receptacle connectors 219 of each of the split receptacle connectors 400 may be configured such that the second receptacle connectors 219 are electrically insulated from the plug connectors included in the corresponding connector cavity of the other plug constructed according to the SAE J2863 standard.

In the embodiment of FIGS. 2A-2F, the receptacle assembly 200 includes six split receptacle connectors 400. In other embodiments, the receptacle assembly 200 may include fewer than six split receptacle connectors 400. In these and other embodiments, the receptacle assembly 200 may include the central receptacle connector 211. In addition to the central receptacle connector 211, in some embodiments, the receptacle assembly 200 may include up to five receptacle connectors that are radially displaced from the central receptacle connector 211. The up to five receptacle connectors may be configured according to the SAE J2863 standard and one or more of the up to five receptacle connectors may be a standard male connector or another appropriate electrical connector that may conform to the SAE J2863 standard. The receptacle connectors other than the up to five receptacle connectors may include the split receptacle connector 400 described in this disclosure.

Additionally or alternatively, one or more of the split receptacle connectors 400 may include one receptacle connector (e.g., the first receptacle connector 217 or 219) that corresponds to the SAE J2863 standard and two or more receptacle connectors that are outside of the SAE J2863 standard. Some additional details of these embodiments are provided with reference to FIG. 4B.

Figure 3A:
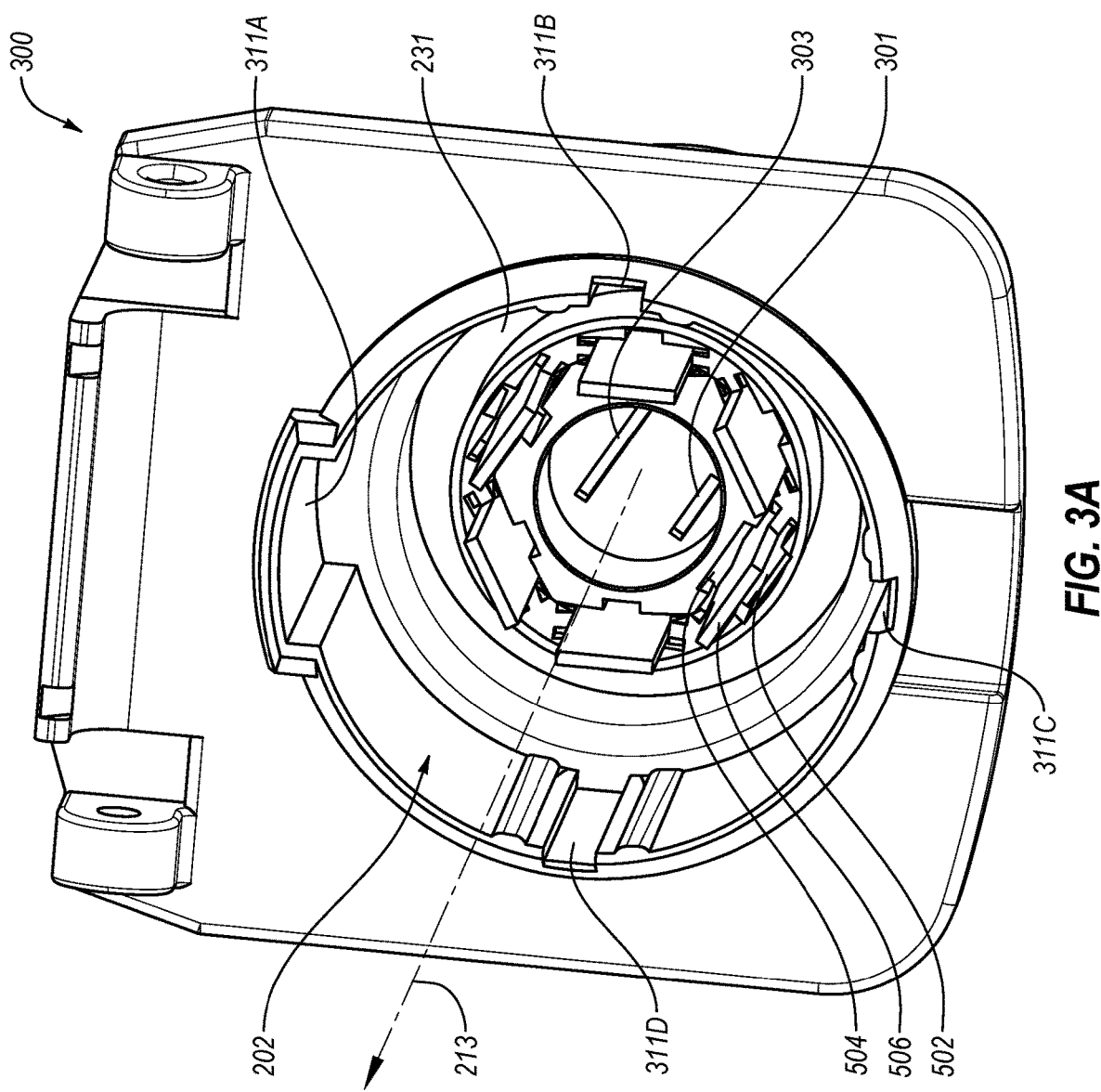
FIG. 3A illustrates an example receptacle housing that may be implemented in the receptacle assembly of FIG. 2A.
Figure 3C:
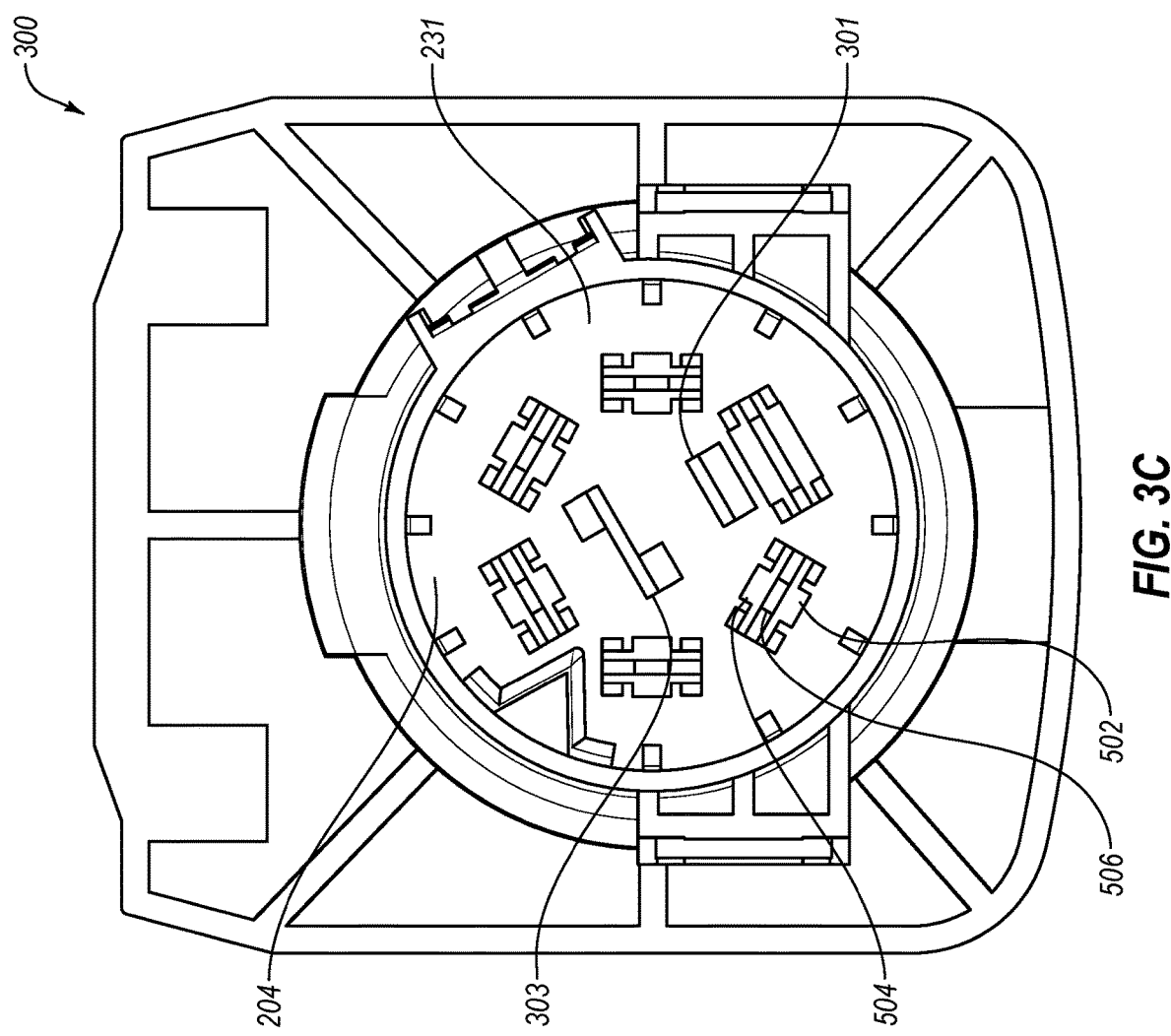
FIG. 3C illustrates another view of the receptacle housing of FIG. 3A.

FIGS. 3A-3C illustrate an example embodiment of the receptacle housing 300. FIG. 3A depicts a perspective view of the receptacle housing 300, FIG. 3B depicts a planar front view of the receptacle housing 300, and FIG. 3C depicts a planar rear view of the receptacle housing 300. With reference to FIGS. 3A and 3B, the receptacle housing 300 defines the first cavity 202. The first cavity 202 includes a substantially cylindrical portion along with one or more alignment features 311A-311D (generally, alignment feature 311 or alignment features 311). The alignment features 311 are configured to orient a plug assembly relative to the receptacle housing 300. The plug assembly such as the plug assembly 600 of FIGS. 1A and 1B may include corresponding alignment features that may be configured to pass through the alignment features 311. Additionally, a plug assembly configured according to the SAE J2863 standard may include one or more corresponding alignment features. The alignment features 311 may help to ensure that electrical connectors designated as corresponding to each other (e.g., 250 and 650 of FIGS. 1A and 1B) contact one another when a plug assembly is positioned in the first cavity 202.

With reference to FIGS. 3A-3C, the receptacle housing 300 further defines one or more central connector openings 301 and 303. The central connector openings 301 and 303 may enable penetration of the central structure 231 by a portion of a central receptacle connector (e.g., the central receptacle connector 211 of FIGS. 2E and 2F).

The receptacle housing 300 of FIGS. 3A-3C further defines multiple first connector openings 502 and multiple second connector openings 504. Only one of the first connector openings 502 and one of the second connector openings 504 is labelled in FIGS. 3A-3C. The first connector openings 502 and the second connector openings 504 extend from the second cavity 204 of FIG. 3C to the first cavity 202 of FIGS. 3A and 3B.

The first connector opening 502 is configured to secure a first receptacle connector relative to the receptacle housing 300. The second connector opening 504 is configured to secure a second receptacle connector relative to the receptacle housing 300. For example, with combined reference to FIGS. 3A and 2E, the first connector opening 502 is configured to secure the first receptacle connector 217 relative to the receptacle housing 300 and the second connector opening 504 may be configured to secure the second receptacle connector 219 relative to the receptacle housing 300.

When the first receptacle connector 217 is positioned in the first connector opening 502, the first receptacle connector 217 is positioned radially with respect to the central axis 213 and the second receptacle connector 219. In addition, when the first receptacle connector 217 is positioned in the first connector opening 502, the first receptacle connector 217 is secured circumferentially around the central axis 213.

Referring to FIGS. 3A-3C, the receptacle housing 300 includes one or more insulator tabs 506. Only one of the insulator tabs 506 is labelled in FIGS. 3A-3C. The insulator tabs 506 may extend into the first cavity 202 from the central structure 231. One or more of the insulator tabs 506 is positioned between one of the first connector openings 502 and one of the second connector openings 504. The insulator tabs 506 are implemented to insulate a first receptacle connector positioned in one of the first connector openings 502 from a second receptacle connector positioned in one of the second connector openings 504.

For example, with reference to FIGS. 3B and 2E, when the first receptacle connector 217 is positioned in the first connector opening 502 and the second receptacle connector 219 is positioned in the second connector opening 504, one of the insulator tabs 506 electrically insulate the first receptacle connector 217 from the second receptacle connector 219.

Figure 4A:
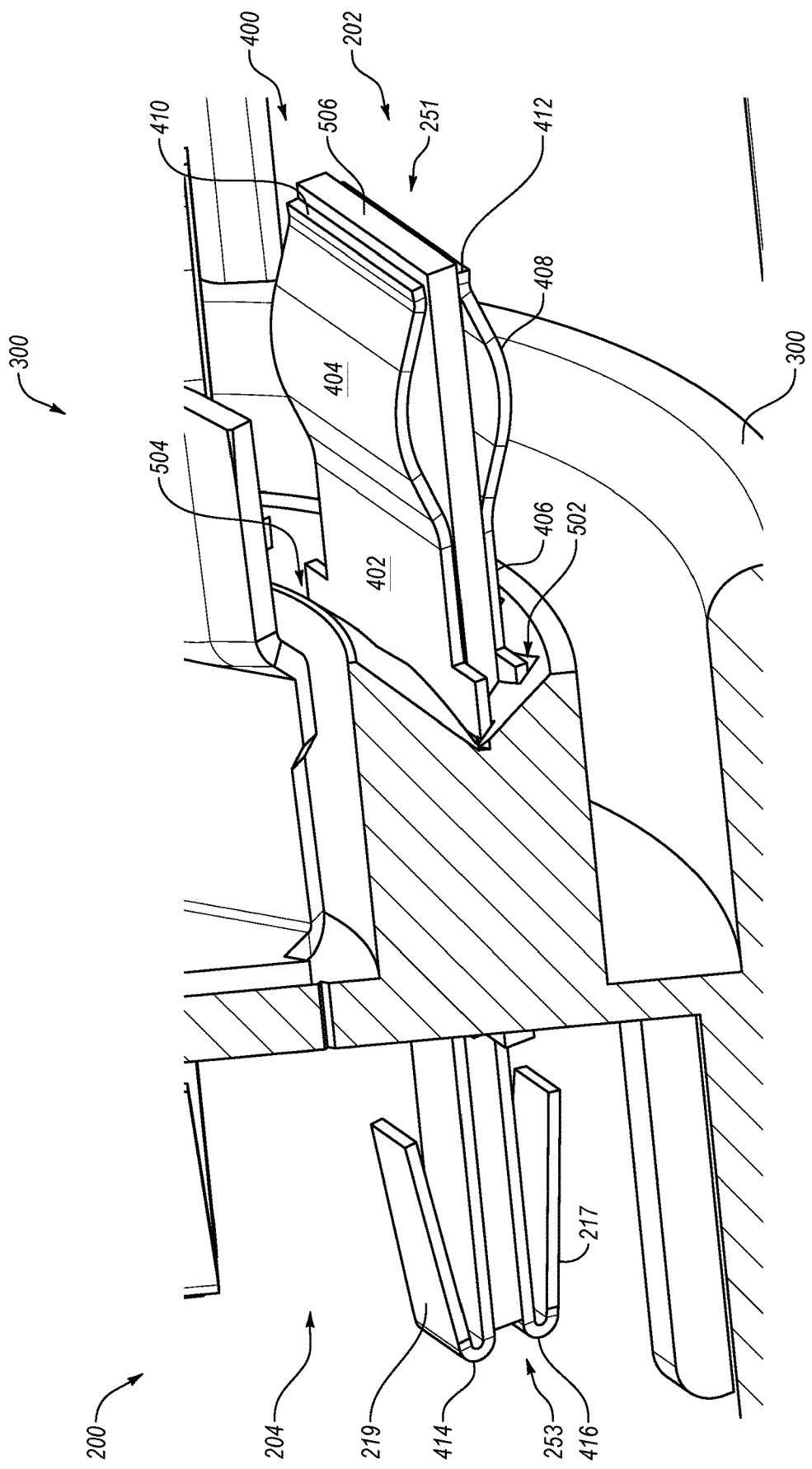
FIG. 4A illustrates an example split receptacle connector that may be implemented in the receptacle assembly of FIG. 2A.
Figure 4C:
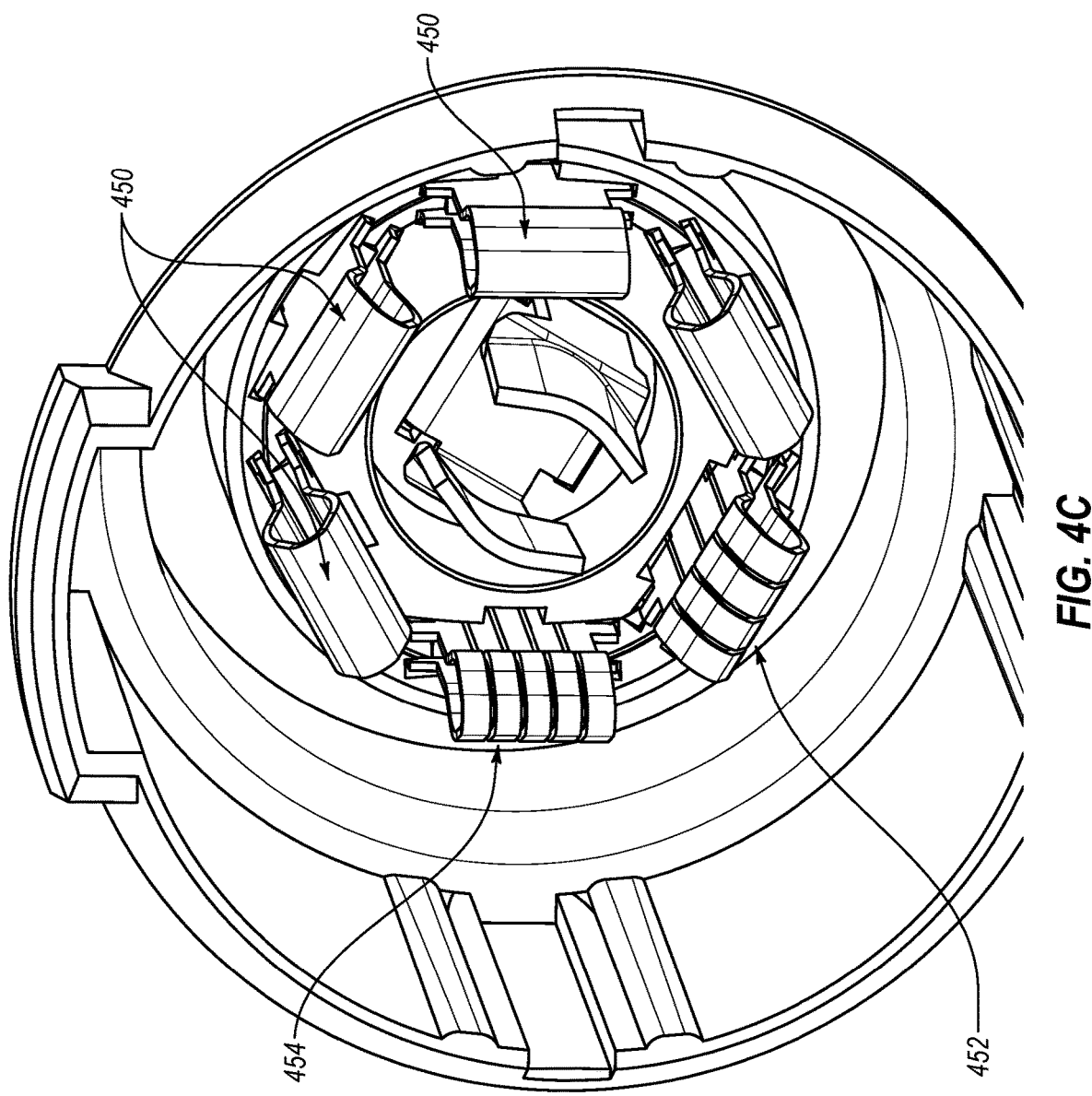
FIG. 4C illustrates other example receptacle connectors that may be implemented in the receptacle assembly of FIG. 2A.

FIG. 4A illustrates an example embodiment of the split receptacle connector 400. FIG. 4A depicts the split receptacle connector 400 with a portion of the receptacle assembly 200. As discussed above, the split receptacle connector 400 may include the first receptacle connector 217 and the second receptacle connector 219 separated by the insulator tab 506. The first receptacle connector 217 is positioned in the first connector opening 502 and the second receptacle connector 219 is positioned in the second connector opening 504.

The first receptacle connector 217 and the second receptacle connector 219 may be included in a first portion 251 of the split receptacle connector 400 that is positioned in the first cavity 202. The first receptacle connector 217 and the second receptacle connector 219 may also be included in a second portion 253 of the split receptacle connector 400 that is positioned in the second cavity 204.

The second receptacle connector 219 includes a substantially planar portion 402 that is connected to an arced portion 404. The arced portion 404 of the second receptacle connector 219 extends towards the central axis (213 of FIGS. 3A and 2F) of the receptacle housing 300 and away from the insulator tab 506, in some embodiments. Similarly, the first receptacle connector 217 includes a substantially planar portion 406 that is connected to an arced portion 408. The arced portion 408 of the first receptacle connector 217 extends away from the central axis of the receptacle housing 300 and away from the insulator tab 506, in some embodiments.

In some embodiments, the substantially planar portion 402 of the second receptacle connector 219 is radially displaced from the central axis 213 of FIG. 2F. Additionally or alternatively, the substantially planar portion 406 of the first receptacle connector 217 is radially displaced from the central axis 213 of FIG. 2F and radially displaced from the substantially planar portion 402 of second receptacle connector 219 in some embodiments. In these or other embodiments, the substantially planar portion 402 of the second receptacle connector 219 is oriented substantially parallel to the substantially planar portion 406 of the second receptacle connector 219.

The insulator tab 506 may contact the first receptacle connector 217 and the second receptacle connector 219 at the substantially planar portions 402 and 406 in some embodiments. Additionally, the insulator tab 506 may contact the first receptacle connector 217 and the second receptacle connector 219 at upper ends 410 and 412 of the arced portions 404 and 408. In some embodiments, the insulator tab 506 may be configured to always contact one or both of the first receptacle connector 217 and the second receptacle connector 219. Additionally or alternatively, the first receptacle connector 217 or the second receptacle connector 219 may not always contact the insulator tab 506, but the insulator tab 506 may be configured to prevent the first receptacle connector 217 from contacting the second receptacle connector 219 and to electrically insulate the first receptacle connector 217 from the second receptacle connector 219.

The arced portions 404 and 408 may flex towards the insulator tab 506. For example, when a plug assembly such as the plug assembly 600 of FIGS. 1A and 1B or another plug assembly constructed according to the SAE J2863 standard is inserted in the receptacle assembly 200, the split receptacle connector 400 may be received in a connector cavity of a female electrical connector assembly. The connector cavity of the female electrical connector assembly may be sized such that the arced portions 404 and 408 are pressed towards the insulator tab 506. Pressing the arced portions 404 and 408 towards the insulator tab 506 may help maintain contact between one or both of the arced portions 404 and 408 and corresponding electrical contact surfaces of a plug connector that may be included in the connector cavity of the female electrical connector assembly. Additionally or alternatively, the pressing of the arced portions 404 and 408 towards the insulator tab 506 may help retain the female electrical connector assembly in a given position relative to the split receptacle connector 400, such as within the first cavity 202.

In the embodiment of FIG. 4A, the insulator tab 506 extends from the upper ends 410 and 412 of the arced portions 404 and 408 to lower ends 414 and 416 of the first and second receptacle connectors 217 and 219. In addition, in the embodiment of FIG. 4A, the insulator tab 506 includes a single structure. In other embodiments, the insulator tab 506 may not extend from the upper ends 410 and 412 to the lower ends 414 and 416. Additionally or alternatively, the insulator tabs 506 may include multiple structures that separate the first receptacle connector 217 from the second receptacle connector 219.

FIG. 4B illustrates another example embodiment of the split receptacle connector 400. In the split receptacle connector 400 of FIG. 4B, the first receptacle connector 217 corresponds to the SAE J2863 standard. In addition to the first receptacle connector 217, the split receptacle connector 400 includes two or more second receptacle sub-connectors 431A-431D (generally, sub-connectors 431 or sub-connector 431).

The sub-connectors 431 may be included on one side of the split receptacle connectors 400 with the other side of the split receptacle connectors 400 including the first receptacle connector 217. Accordingly, the sub-connectors 431 may form one side of a male connector that may be positioned with the first receptacle connector 217 in a female connector assembly.

The sub-connectors 431 may be electrically insulated from the first receptacle connector 217 and from each of the other sub-connectors 431. For instance, the sub-connectors 431 may be separated from one another by sub-connector insulators 433. In some embodiments, one or more of the sub-connector insulators 433 may include a physical component that may act as an electrical insulator, such as a plastic tab. In these or other embodiments, one or more of the sub-connector insulators 433 may include air. Each of the sub-connectors 431 may be configured to provide electrical connections for systems and corresponding electrical signals that may be outside of or in addition to the SAE J2863 standard. Embodiments of the receptacle assembly 200 implementing the sub-connectors 431 may be configured to communicate with a plug assembly with corresponding sub-connectors.

In the embodiment of FIG. 4B, the receptacle connectors 250 include six split receptacle connectors 400. Two of the six split receptacle connectors 400 include the sub-connectors 431 while four of the six split receptacle connectors 400 do not include the sub-connectors 431. In other embodiments, one or more of the split receptacle connectors 400 may include sub-connectors 431.

Additionally, the split receptacle connector 400 of FIG. 4B includes four sub-connectors 431. In other embodiments, the split receptacle connectors 400 may include more than four (e.g., five, six, twenty, etc.) sub-connectors 431 or fewer than four (e.g., three or two) sub-connectors 431. Additionally still, in the embodiment of FIG. 4B, the inner face (e.g., closer to the central receptacle connector 211) of the split receptacle connector 400 includes the sub-connectors 431. In other embodiments, the outer face (e.g., farther from the central receptacle connector 211) of the split receptacle connector 400 may include the sub-connectors 431.

Figure 5:
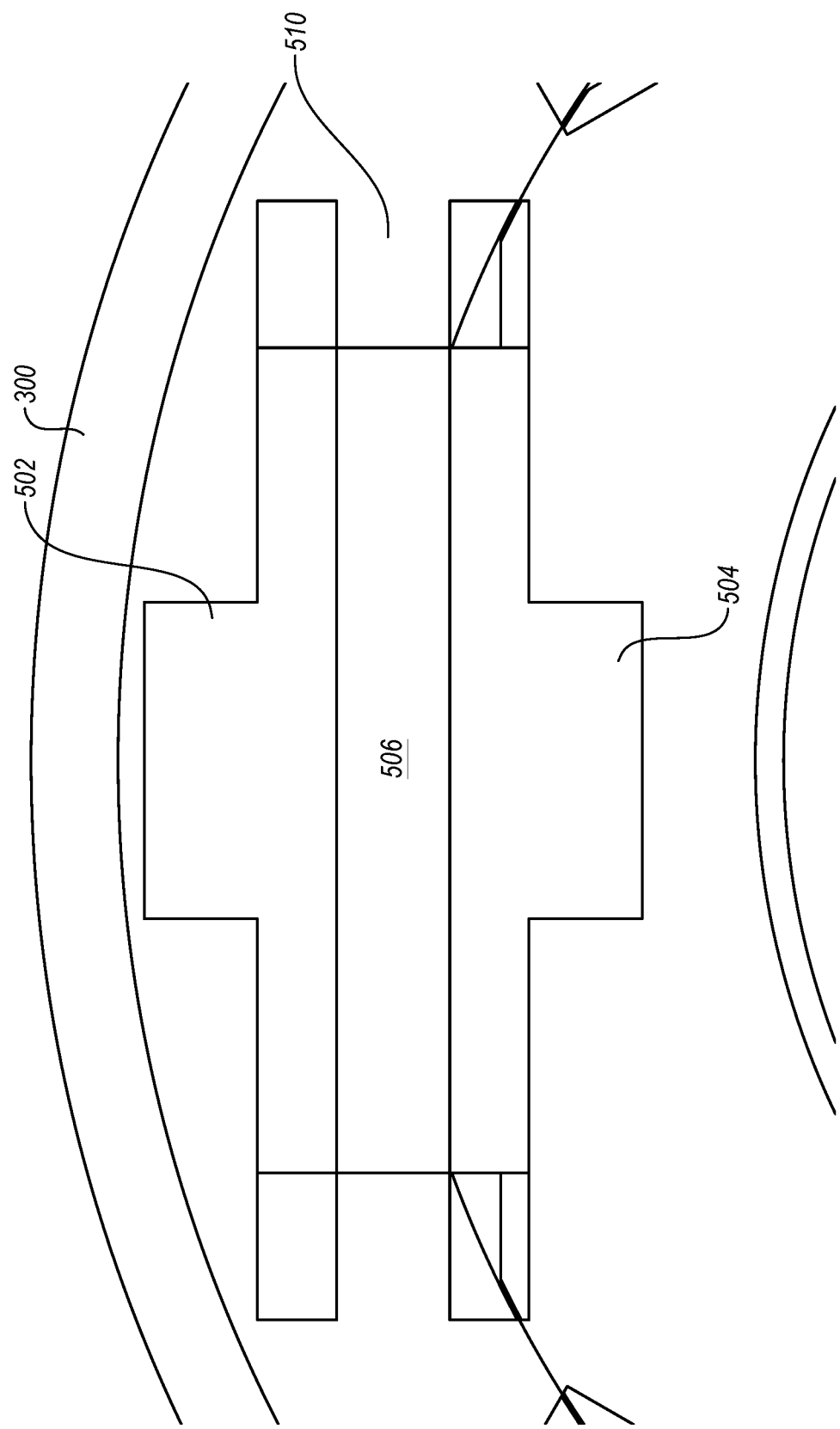
FIG. 5 illustrates a portion of the receptacle housing of FIG. 3A.

FIG. 5 illustrates a portion of an example embodiment of the receptacle housing 300. FIG. 5 depicts a planar view of a portion of the receptacle housing 300 that includes the first connector opening 502 and the second connector opening 504. The first connector opening 502 may be substantially symmetric to the second connector opening 504 across the insulator tab 506. The first connector opening 502 is displaced radially from the second connector opening 504.

In some embodiments, each of the first connector opening 502 and the second connector opening 504 may be individually defined in the receptacle housing 300. In these and other embodiments, the insulator tab 506 or some portion thereof may be formed between the first connector opening 502 and the second connector opening 504. In other embodiments, the first connector opening 502, the second connector opening 504, and a tab opening 510 may be defined in the receptacle housing 300. In these and other embodiments, the first connector opening 502, the second connector opening 504, and the tab opening 510 may be a single volume that is defined in the receptacle housing 300. The tab opening 510 may be sized to receive the insulator tab 506. In addition, in these and other embodiments, the split receptacle connector (e.g., the split receptacle connector 400 described in this disclosure) may be assembled and then positioned in the first connector opening 502, the second connector opening 504, and the tab opening 510. For example, with reference to FIGS. 4 and 5, the first receptacle connector 217 may be assembled with the second receptacle connector 219 and the insulator tab 506 to form the split receptacle connector 400. The split receptacle connector 400 may be positioned in the first connector opening 502, the second connector opening 504, and the tab opening 510 in an assembled configuration. In some embodiments, one or more of the first receptacle connector 217, the second receptacle connector 219, the insulator tab 506, or some combination thereof may be positioned in one or more of the first connector opening 502, the second connector opening 504, and the tab opening 510 individually.

Modifications, additions, or omissions may be made to the receptacle assembly 200 without departing from the scope of the present disclosure. For example, in the embodiment of FIG. 4B, one of the split receptacle connectors 400 includes receptacle sub-connectors 431. In these or other embodiments, more than one of the split receptacle connectors 400 may include receptacle sub-connector 431.

Additionally or alternatively, instead of the central receptacle connector 211 including an electrical connector in which a single electrical signal is communicated, two or more central receptacle connectors that may be electrically insulated from each other may be included in the receptacle assembly 200. For example, the central receptacle connector 211 is illustrated as having two portions in the illustrated embodiment in which the two portions may be electrically connected to each other. In another embodiment, each of the two portions may be electrically insulated from each other such that they may be configured to provide electrical connections for different electrical signals. A first of the two portions may correspond to the SAE J2863 standard and a second of the two portions may be outside of or in addition to the SAE J2863 standard. Additionally or alternatively, the first portion or the second portion may include receptacle sub-connectors in some embodiments. In these or other embodiments, the receptacle assembly 200 may include a switch that may be configured to electrically disconnect the second portion from an associated system or systems (e.g., when the second portion includes sub-connectors) of the tow vehicle for when a plug assembly that corresponds to the SAE J2863 standard is inserted in the receptacle assembly 200. Further, in some embodiments, one or more insulator tabs 506 may be omitted and the corresponding first and second receptacle connectors may have, for example, air between them, and may be configured such that they may not touch.

In addition, in the example embodiment of FIG. 4B, the inner receptacle connectors are illustrated as having sub-connectors. However, in some embodiments, one or more outer receptacle connectors may be configured with sub-connectors in a similar manner. Additionally or alternatively, an outer receptacle connector with sub-connectors may be grouped with an inner receptacle connector with sub-connectors. In these or other embodiments, an outer receptacle connector with sub-connectors may be grouped with an inner receptacle connector that does not include sub-connectors. Further, in some embodiments, one or more receptacle connectors may be configured and sized according to the SAE J2863 such as illustrated by receptacle connectors 450 in FIG. 4C. Additionally or alternatively, one or more receptacle connectors may have sub-connectors electrically insulated from each other and configured such as illustrated by receptacle connectors 452 and 454 illustrated in FIG. 4C. Further, the number of sub-connectors for the configurations like the examples of receptacle connectors 452 and 454 may be more or fewer than those illustrated in FIG. 4C. In addition, in some embodiments, the receptacle assembly 200 may include one or more of the receptacle connectors described in the present disclosure. For example, the receptacle assembly 200 may include one or more receptacle connectors 400 without sub-connectors 431; one or more receptacle connectors 400 with sub-connectors 431 on the inner or the outer receptacle connectors, one or more receptacle connectors 450, one or more receptacle connectors configured such as receptacle connectors 452 and 454, or any combination thereof.

Figure 6A:
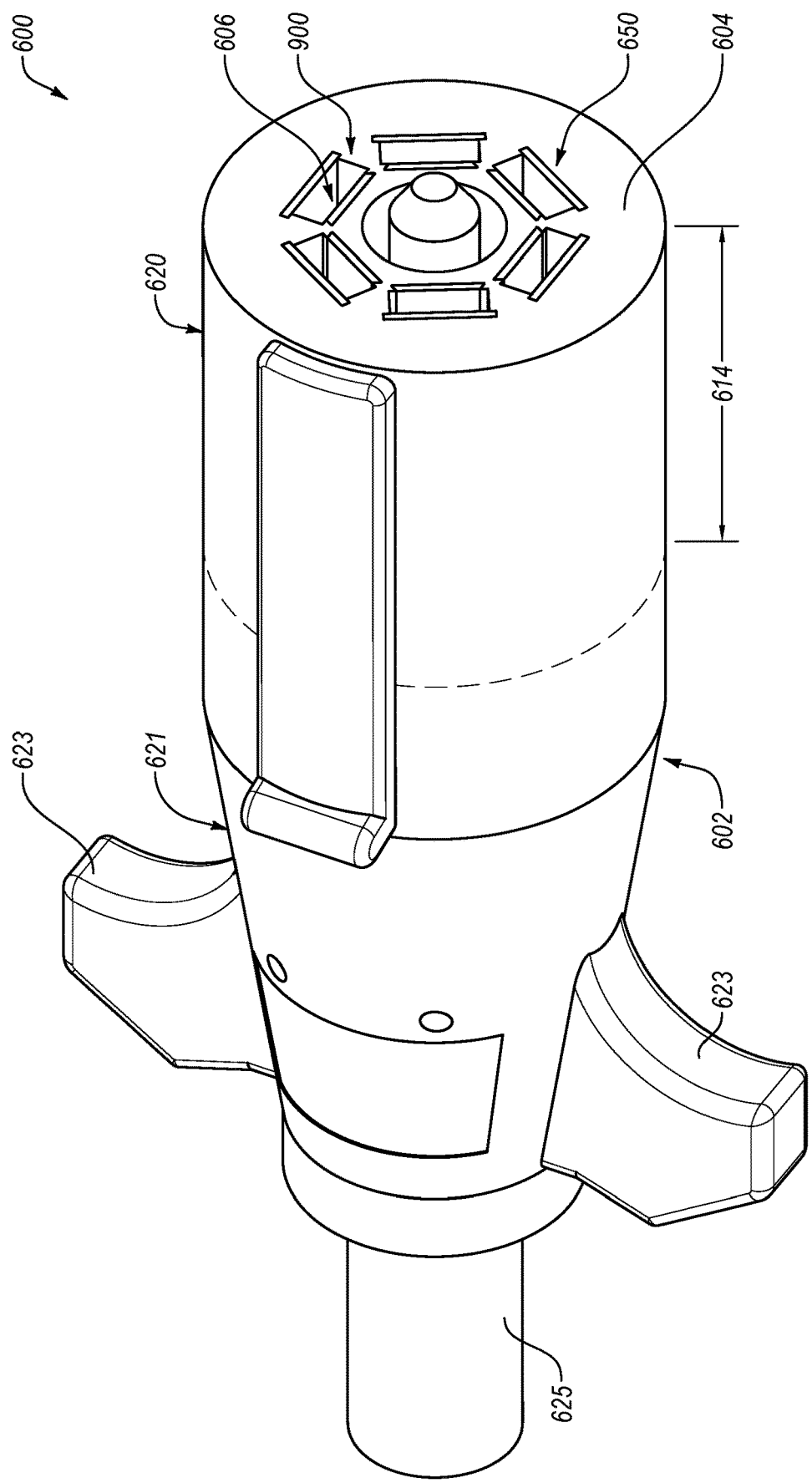
FIG. 6A illustrates an example plug assembly that may be implemented in the connector assemblies of FIGS. 1A-1D.
Figure 6B:
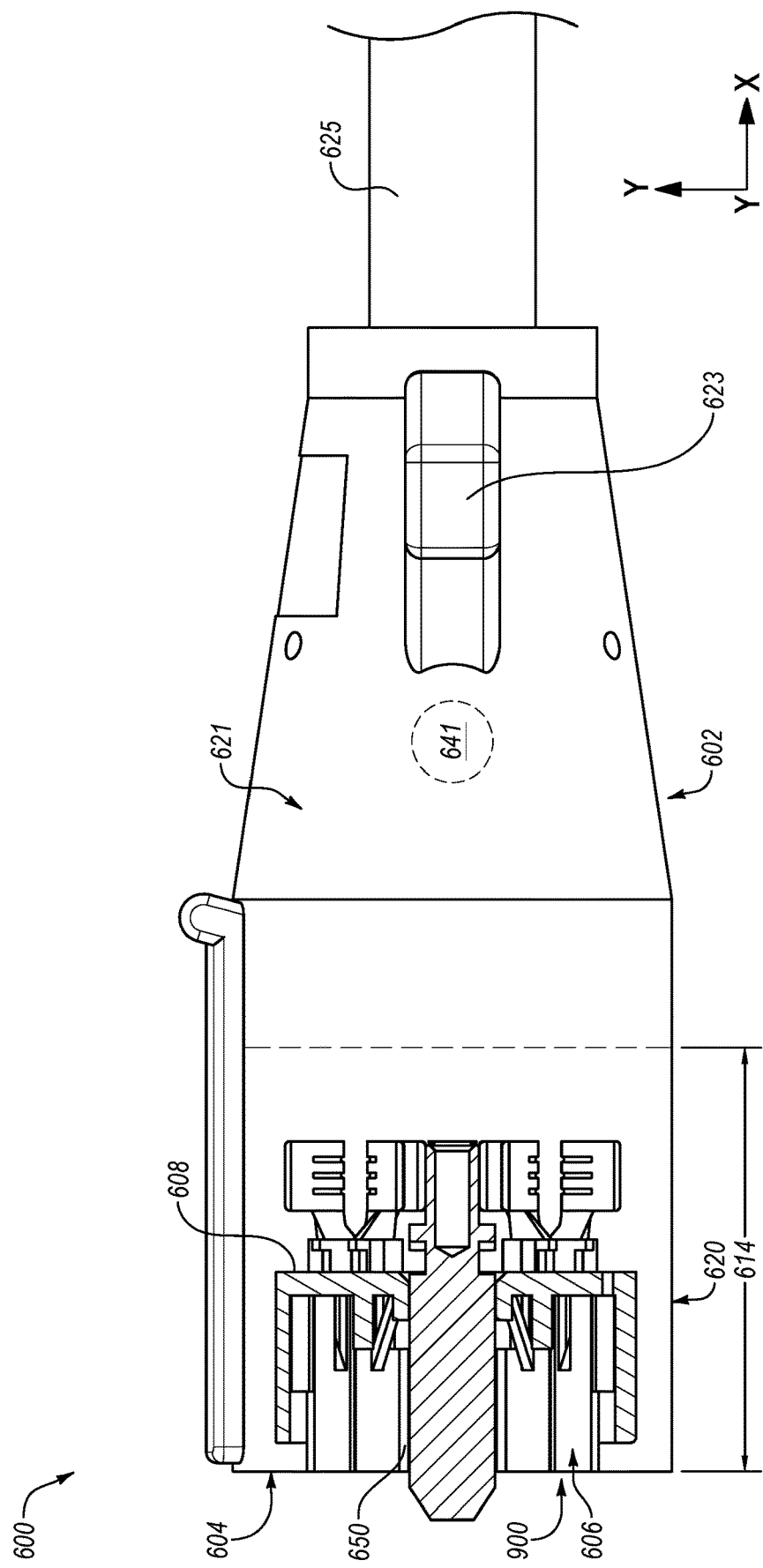
FIG. 6B illustrates another view of the plug assembly of FIG. 6A.
Figure 6C:
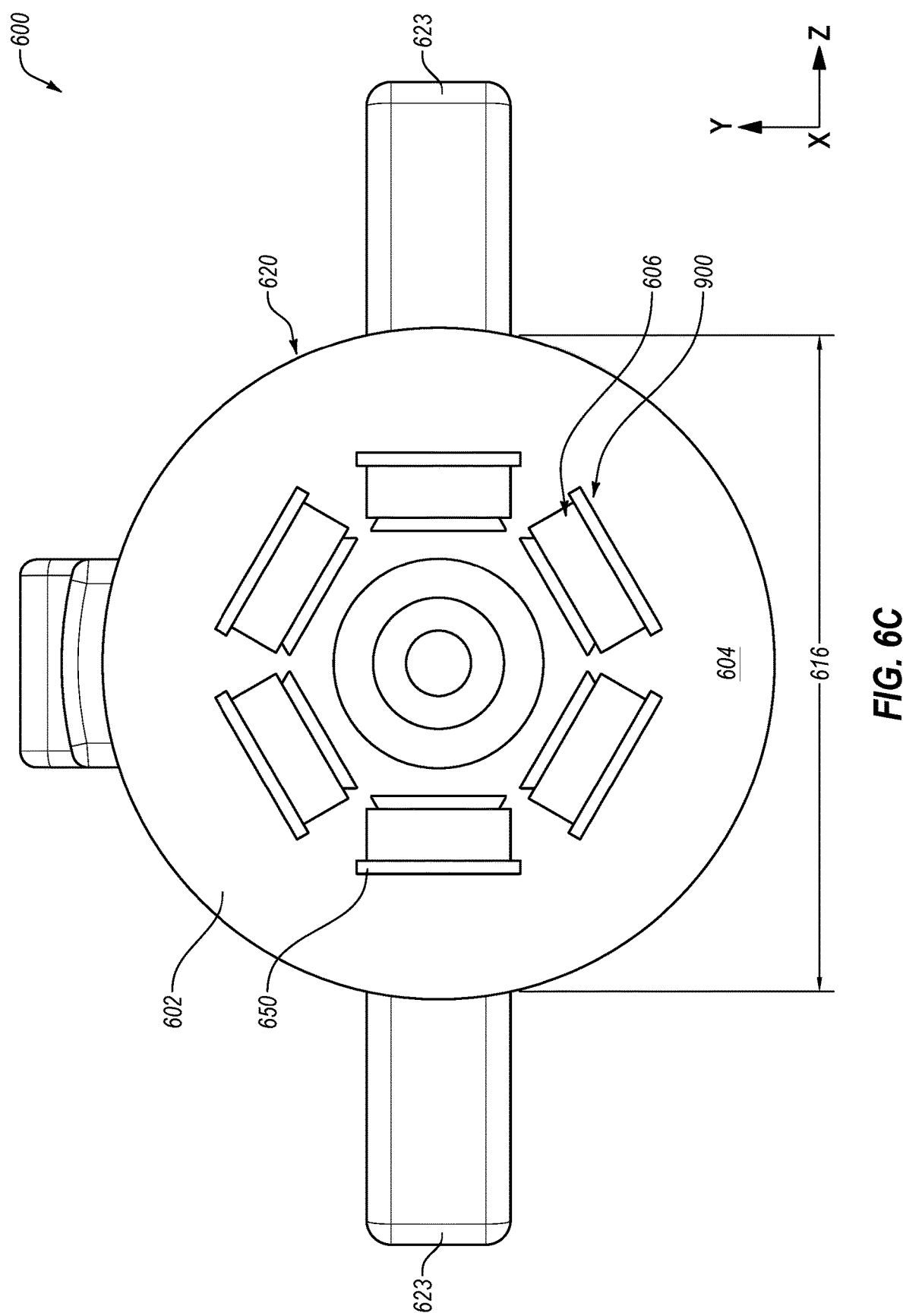
FIG. 6C illustrates another view of the plug assembly of FIG. 6A.

FIGS. 6A-6C illustrates an example embodiment of the plug assembly 600 of FIGS. 1A and 1B. FIG. 6A depicts a perspective view of the plug assembly 600. FIG. 6B depicts a sectional view of the plug assembly 600. FIG. 6C depicts a front view of the plug assembly 600. As discussed above, one or more components of the plug assembly 600 may correspond to the SAE J2863 standard. In addition, the plug assembly 600 may include the plug connectors 650. A subset of the plug connectors 650 may correspond to the SAE J2863 standard and another subset of the plug connectors 650 may be outside of or in addition to the SAE J2863 standard.

The plug assembly 600 includes a plug housing 602. The plug housing 602 includes an outer casing or housing in which the plug connectors 650 are retained. The plug housing 602 includes a substantially cylindrical portion 620 that extends from a connecting face 604 to some distance 614 from the connecting face 604. The distance 614 may correspond to a depth of a first cavity of a receptacle assembly. In addition, a diameter 616 (FIG. 6C) of the substantially cylindrical portion 620 may correspond to a diameter of the receptacle assembly. For instance the diameter 616 may be about four cm.

For example, with combined reference to FIGS. 2C, 6A, and 6B, the distance 614 may be substantially similar to a depth 261 of the first cavity 202. In addition, the diameter 616 of the substantially cylindrical portion 620 may be substantially similar to the diameter 240 of the first cavity 202. In some embodiments, the diameter 240, the diameter 616, the depth 261, the distance 614, or some combination thereof may be sized according to the SAE J2863 standard. Accordingly, the substantially cylindrical portion 620 of the plug assembly 600 may be configured to be positioned in the receptacle assembly 200.

Referring to FIGS. 6A-6C, the plug housing 602 may include a tapered portion 621 and one or more grips 623 in some embodiments. The tapered portion 621 transitions from the cylindrical portion 620 to a cable receiving portion that may include a cable 625 coupled thereto. The grips 623 are attached to the tapered portion 621. The grips may help a user to remove the plug assembly 600 from a receptacle assembly. For example, with reference to FIG. 6B, the user may impose on the grips 623 a force in substantially the x-direction, which may result in movement of the plug assembly 600 in the x-direction and out of a receptacle assembly. In some embodiments, the plug housing 602 may include more than two or fewer than two grips 623. Additionally or alternatively, the grips 623 may be attached to the plug housing 602 at another location.

The plug assembly 600 includes the plug connectors 650. The plug connectors 650 are disposed in the plug housing 602. In some embodiments, the plug connectors 650 may be constructed of a metal such as copper, steal, zinc, combinations thereof, or another electrically conductive material. In some embodiments, the plug housing 602 may be constructed of a plastic in which the plug connectors 650 are molded. In these and other embodiments, the plug connectors 650 may be fixed to the plug housing 602. For example, the plug connectors 650 may be soldered or epoxied to the plug housing 602.

In the plug assembly 600 of FIGS. 6A-6C, one or more connector cavities 606 are defined in the connecting face 604 of the plug housing. Only one of the connector cavities 606 is labelled in FIGS. 6A-6C. The connector cavities 606 extend from the connecting face 604 in an x-direction. Thus, the connector cavities 606 extend from the connecting face 604 into the plug housing 602 toward the cable 625 and are closed, that is, do not extend through the plug housing. Thus, the connector cavities 606 are open at the connecting face 604 and do not include another opening. In the illustrated embodiment, two or more of the plug connectors 650 are disposed and positioned, at least partially, in each of the connector cavities 606 to form one of multiple female connector assemblies 900. In other embodiments, one or more of the connector cavities 606 may only have one plug connector 650 disposed therein such as illustrated by female connector assemblies 950 of FIG. 9C described further below. The female connector assemblies 900 are configured to receive male electrical connectors. For example, with combined reference to FIGS. 4 and 6C, the split receptacle connector 400 may be configured to be received in the female connector assembly 900. Some additional details of the female connector assembly 900 are provided with reference to FIGS. 9A and 9B.

Figure 7A:
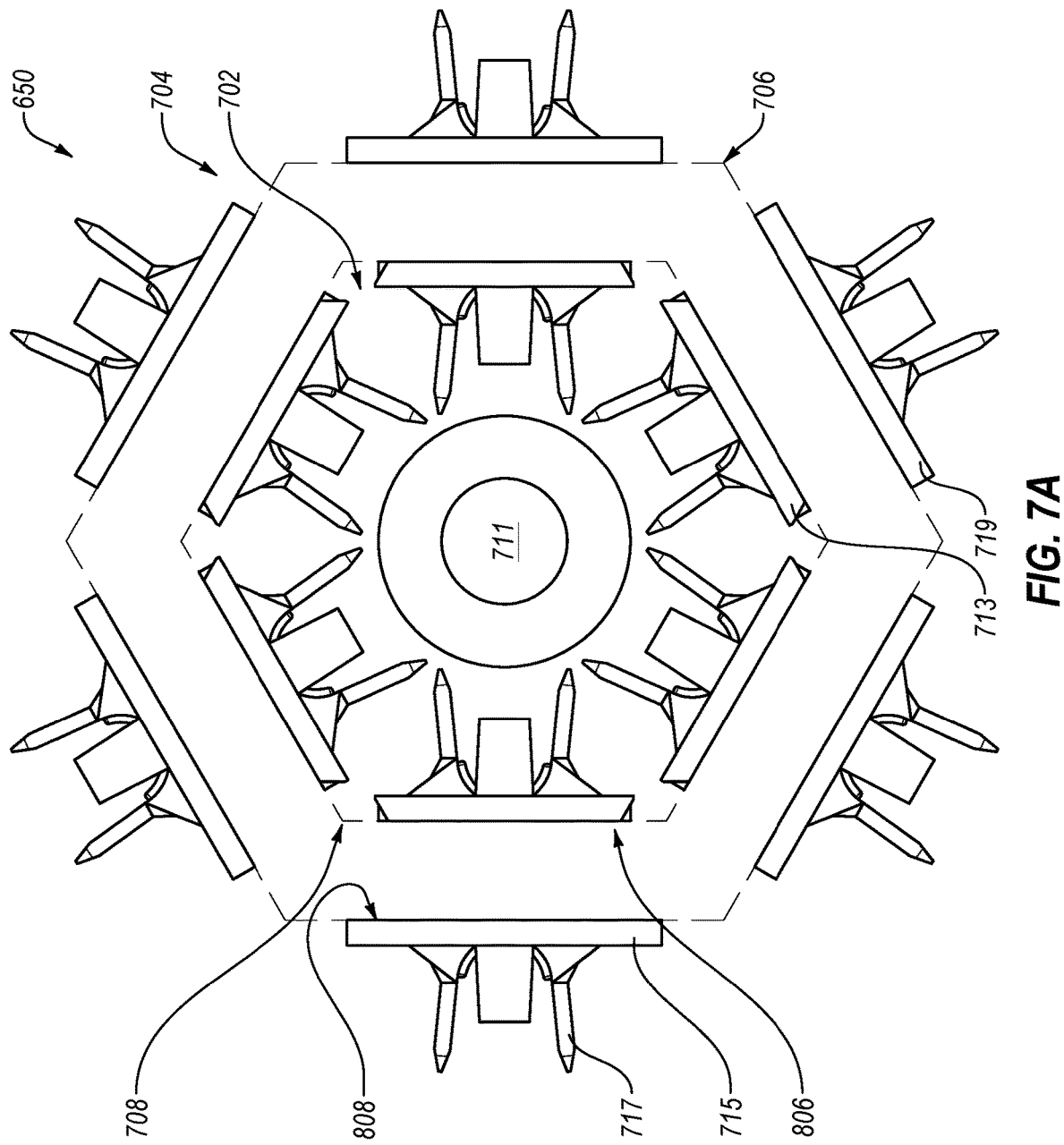
FIG. 7A illustrates example plug connectors that may be implemented in the plug assembly of FIG. 6A.
Figure 7B:
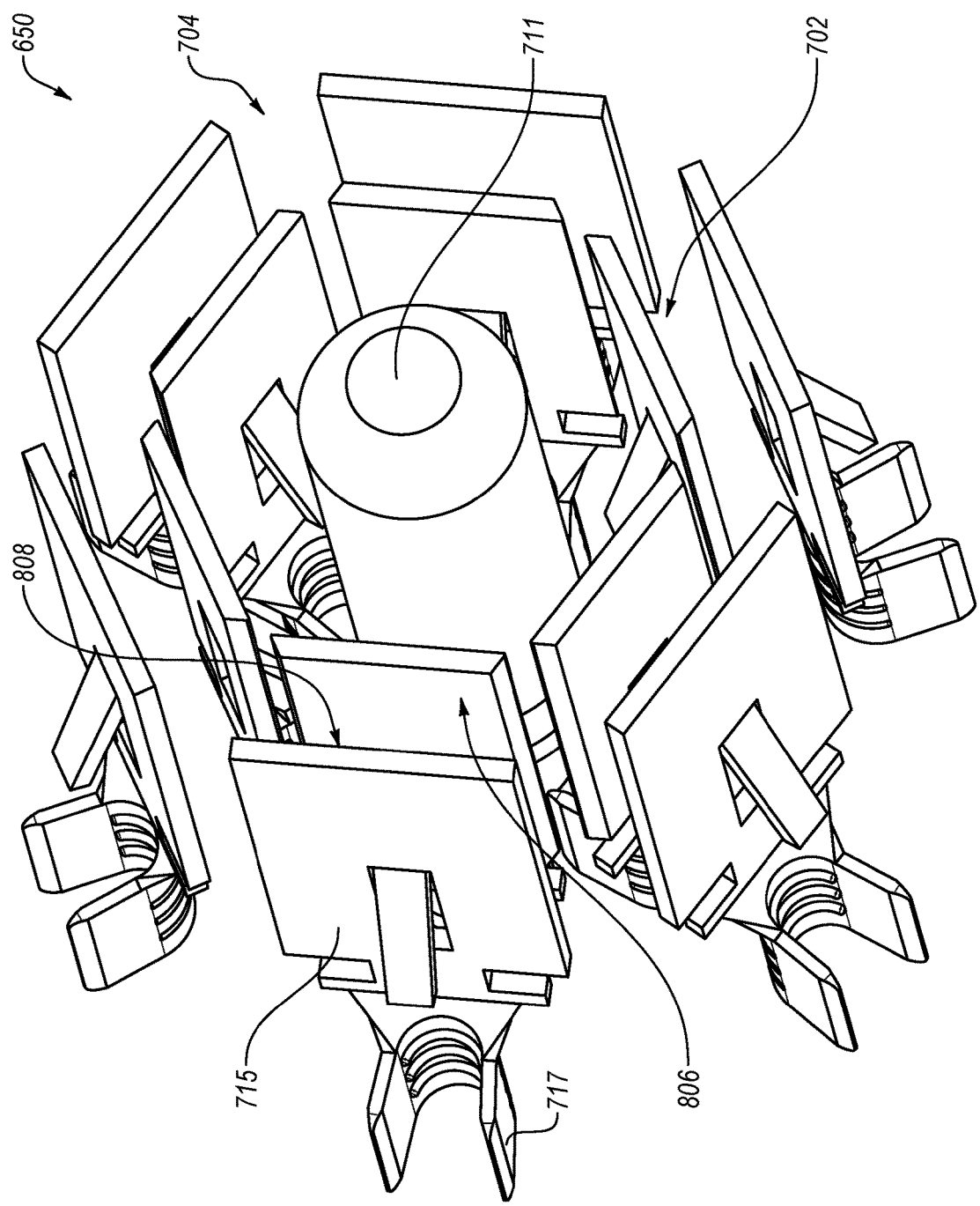
FIG. 7B illustrates another view of the plug connectors of FIG. 7A.
Figure 7C:
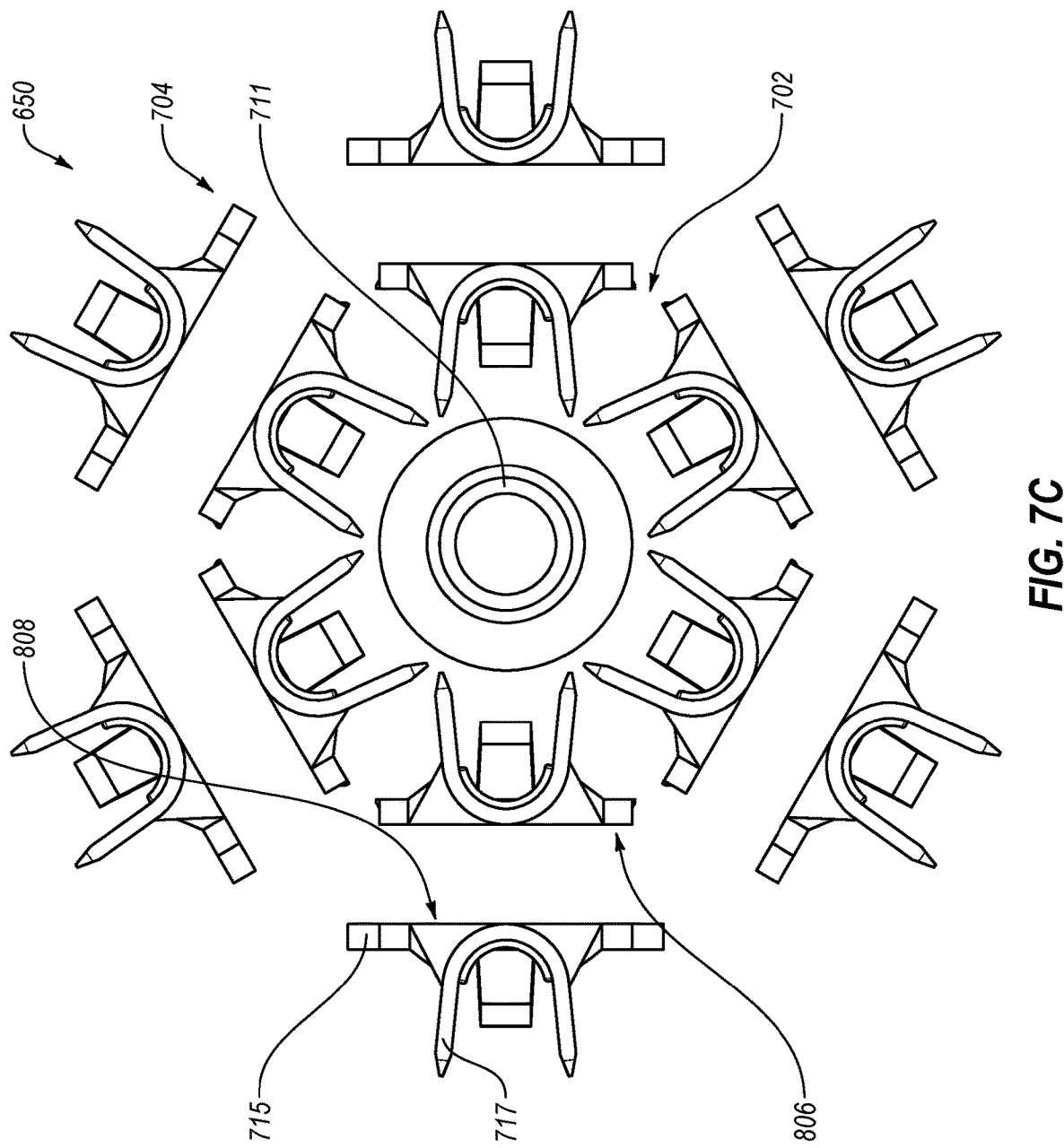
FIG. 7C illustrates another view of the plug connectors of FIG. 7A.

FIGS. 7A-7C illustrate and example embodiment of the plug connectors 650. The plug connectors 650 are depicted with the plug housing 602 of FIGS. 6A-6C removed. However, the arrangement of the plug connectors 650 depicted in FIGS. 7A-7C is substantially similar to the arrangement of the plug connectors 650 when positioned in the plug housing 602. FIG. 7A depicts a planar front view of the plug connectors 650. FIG. 7B depicts a perspective view of the plug connectors 650. FIG. 7C depicts a planar rear view of the plug connectors 650. The plug connectors 650 are configured to be electrically connected to systems of a trailer and to contact one or more receptacle connectors. Contact between the plug connectors 650 and the receptacle connectors of a receptacle assembly enables communication of electrical signals with the systems of the trailer and the tow vehicle.

The plug connectors 650 may include a central plug connector 711, an outer subset of plug connectors 704 (hereinafter, "outer subset 704"), and an inner subset of plug connectors 702 (hereinafter, "inner subset 702"). The plug connectors 650 of the inner subset 702 include multiple electrical connectors that are positioned circumferentially around the central plug connector 711. The inner subset 702 is configured in an inner hexagonal arrangement 708 (FIG. 7A). The plug connectors 650 of the outer subset 704 include multiple electrical connectors that are positioned circumferentially around the central plug connector 711. The outer subset 704 is radially displaced from the inner subset 702 away from the central plug connector 711. The outer subset 704 is configured in an outer hexagonal arrangement 706 (FIG. 7A). In some embodiments, the inner hexagonal arrangement 708 or the outer hexagonal arrangement 706 may be sized, oriented, spaced, arranged, etc. according to the SAE J2863 standard.

In some embodiments, each of the plug connectors 650 of the inner subset 702 may be positioned with one of the plug connectors 650 of the outer subset 704 in one of the connector cavities 606. In these and other embodiments, a plug connector 650 of the inner subset 702 that is positioned in the same connector cavity with of the plug connectors 650 of the outer subset 704 may be considered grouped. However, plug connectors 650 of the inner subset 702 being grouped with plug connectors 650 of the outer subset 704 does not indicate that electrical signals that may be carried by the plug connectors are grouped or otherwise are associated or that the plug connectors 650 are grouped in any other manner other than in the positioning of the plug connectors within the plug housing 602. For example, in FIG. 7A a first plug connector 719 of the outer subset 704 may be grouped with a second plug connector 713 of the inner subset 702. Grouped plug connectors may be positioned in one of the connector cavities 606 of FIGS. 6A-6C to form one of the female connector assemblies 900.

The inner subset 702 and the outer subset 704 each include a substantially planar portion 715 and a crimp portion 717. Only one of the substantially planar portions 715 and one of the crimp portions 717 are labelled in FIGS. 7A-7C. The crimp portion 717 may be configured to receive a wire and to be mechanically altered to retain the wire relative to the crimp portion 717 or the plug connector 704. The substantially planar portions 715 of the outer subset 704 of plug connectors 650 includes a contact surface 808. The substantially planar portions 715 of the inner subset 702 of plug connectors 650 includes a contact surface 806. The contact surfaces 806 and 808 may be configured to contact a receptacle connector when a plug assembly that includes the plug connectors 650 is positioned in a first cavity of a receptacle assembly, such as the receptacle assembly 200.

In the embodiment of FIGS. 7A-7C, the crimp portions 717 of the outer subset 704 are oriented away from the central plug connector 711. The crimp portions 717 of the inner subset 702 are oriented towards the central plug connector 711.

In addition, in the embodiment of FIGS. 7A-7C, the contact surfaces 806 of the inner subset 702 are oriented away from the central plug connector 711. The contact surfaces 808 of the outer subset 704 are oriented towards the central plug connector 711. The inner subset 702 is radially displaced from the outer subset 704 such that the contact surfaces 806 are radially displaced from the contact surfaces 808. Accordingly, volumes are defined between the contact surfaces 806 and 808. Male electrical connectors (e.g., receptacle connectors described above) may be introduced into the volumes as described elsewhere in the disclosure.

In some embodiments, the central plug connector 711 and the outer subset 704 may correspond to the SAE J2863 standard. In these and other embodiments, one or more of the inner subset 702 may be outside of or in addition to the SAE J2863 standard. For example, in these and other embodiments, the outer subset 704 of plug connectors 650 may be similar or analogous to the first plug connectors discussed before a discussion of the Figures and the inner subset 702 of plug connectors 650 may be similar or analogous to the second plug connectors discussed before a discussion of the Figures. In other embodiments, the central plug connector 711 and the inner subset 702 may correspond to the SAE J2863 standard. In these and other embodiments, one or more of the outer subset 704 may be outside of or in addition to the SAE J2863 standard. In yet other embodiments, some of the inner subset 702 and some of the outer subset 704 may correspond to the SAE J2863 standard. In these and other embodiments, the remaining plug connectors of the inner subset 702 and the outer subset 704 may be outside of or in addition to the SAE J2863 standard.

In the embodiment depicted in FIGS. 7A-7C, thirteen plug connectors 650 are depicted; six in the inner subset 702, six in the outer subset 704, and the central plug connector 711. In other embodiments, the plug connectors 650 may include fewer than thirteen plug connectors. For example, the plug connectors 650 may include the central plug connector 711, six plug connectors 650 in the outer subset 704, and 1, 2, 3, 4, 5, or 6 plug connectors 650 in the inner subset 702. Alternatively, the plug connectors 650 may include the central plug connector 711, six plug connectors 650 in inner subset 702 and 1, 2, 3, 4, 5, or 6 plug connectors 650 in outer subset 704.

With reference to FIGS. 6B and 11, in some embodiments, the plug assembly 600 may include a switch mechanism 641. The switch mechanism 641 may be configured to insulate one or more of the plug connectors 650 from one or more wires that are retained in the plug assembly 600. For example, in a first position, the switch mechanism 641 may connect only a subset of the plug connectors 650 that correspond to the SAE J2863 standard to systems of a trailer, but may isolate or disconnect a subset of the plug connectors 650 that do not correspond to the SAE J2863 standard from corresponding wires retained in the plug assembly. In a second position, the switching mechanism 641 may connect all of the plug connectors 650 to wires retained in the plug assembly 600. Accordingly, when the switch mechanism 641 is in the first position, the plug assembly 600 may be configured to provide electrical connections for a seven-way receptacle assembly. When the switching mechanism 641 is in the second position, the plug assembly may be configured to provide electrical connections for a receptacle assembly that may include receptacle connectors that may be outside of or in addition to the SAE J2863 standard. The switch mechanism 641 may include any suitable switch configured to allow for the connecting and disconnecting of electrical connections, such as a button, a toggle, and the like.

Additionally, in some embodiments, the switch mechanism 641 may be connected to one or more of the plug connectors 650. The one or more of the plug connectors 650 may correspond to one or more connectors of the receptacle connectors 250 that do not correspond to the SAE J2863 standard. In response to the one or more of the plug connectors 650 making contact with or receiving a signal from the corresponding connectors of the receptacle connectors 250, the switch mechanism 641 may connect the subset of the plug connectors 650 that do not correspond to the SAE J2863 standard. In response to the one or more of the plug connectors 650 not making contact with the corresponding connectors of the receptacle connectors 250, the switch mechanism 641 may disconnect the subset of the plug connectors 650 that do not correspond to the SAE J2863 standard.

Figure 8:
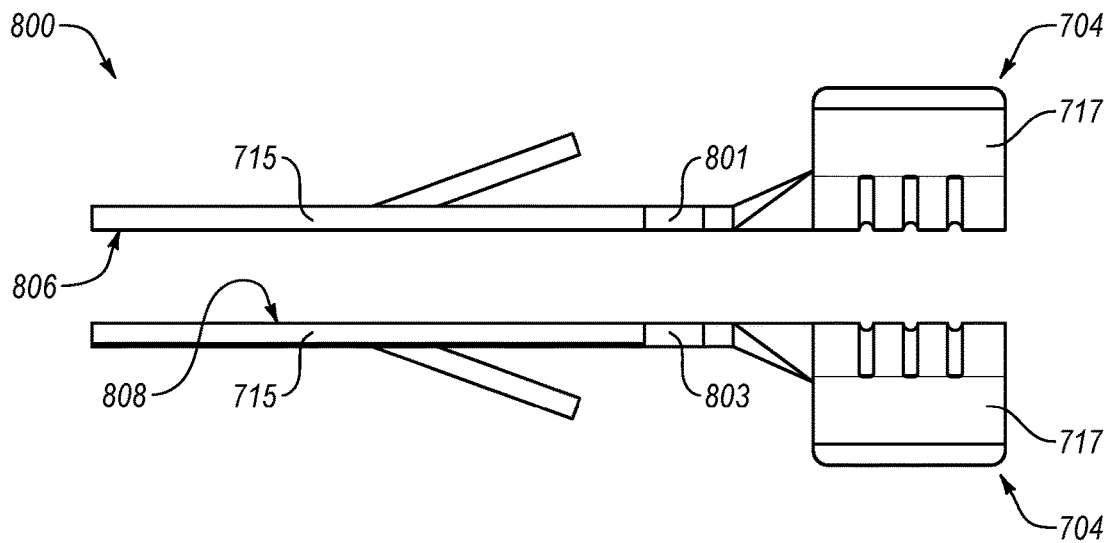
FIG. 8 illustrates an example group of electrical connectors that may be included in the plug connectors of FIG. 7A.

FIG. 8 illustrates an example embodiment of a group of plug connectors 800 (hereinafter, "group 800"). The group 800 of FIG. 8 is representative of one or more groups of electrical connectors that may be included in the plug connectors 650 of FIGS. 7A-7C. The group 800 includes a first plug connector 803 that may be included in the outer subset 704 and a second plug connector 801 that may be included in the inner subset 702. Each of the first plug connector 803 and the second plug connector 801 may include the crimp portion 717 and the substantially planar portion 715 in some embodiments.

The substantially planar portion 715 of the first plug connector 803 includes the contact surface 806. The substantially planar portion 715 of the second plug connector 801 includes the contact surface 808. The contact surface 806 of the first plug connector 803, which is included in the outer subset 704, is oriented to face the contact surface 808 of the second plug connector 801, which is included in the inner subset 702. In addition, the substantially planar portion 715 of each of the first plug connector 803 is positioned substantially parallel to the substantially planar portion 715 of the second plug connector 801.

Figure 9A:
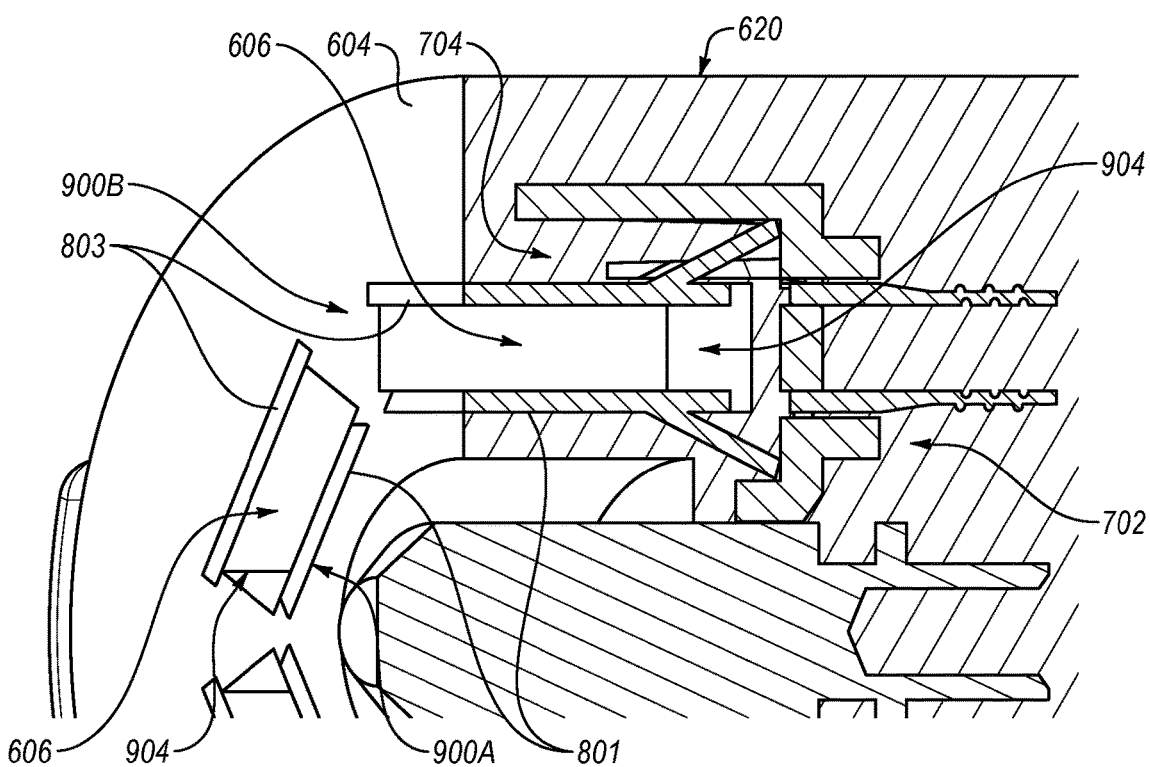
FIG. 9A illustrates an example female connector assembly that may be included in the plug assembly of FIG. 6A.

FIG. 9A illustrates example embodiments of the female connector assembly 900 that may be implemented in the plug assembly 600 of FIGS. 6A-6C. In FIG. 9A, two female connector assemblies 900A and 900B (generally, the female connector assemblies 900) are depicted. An external view of a first female connector assembly 900A is depicted in FIG. 9A and a sectional view of a second female connector assembly 900B is also depicted in FIG. 9A.

As discussed above, the female connector assemblies 900 are disposed in the substantially cylindrical portion 620 of the plug assembly 600. The female connector assemblies 900 include the connector cavities 606 as well as one of the plug connectors of the inner subset 702 and one of the plug connectors of the outer subset 704. In FIG. 9A, the female connector assemblies 900 each include an embodiment of the first plug connector 803 of the outer subset 704 and an embodiment of the second plug connector 801 of the inner subset 702. Between the first plug connector 803 and the second plug connector 801, the female connector assemblies 900 include a volume 904. Accordingly, a male connector may be introduced through an opening defined in the connecting face 604 and positioned in the volume 904. When the male connector is positioned in the volume, contact may be made with one or both of the first plug connector 803 and the second plug connector 801.

For example, with reference to FIGS. 4 and 9, the split receptacle connector 400 may be introduced through the opening defined in the connecting face 604. The split receptacle connector 400 may then be positioned in the volume 904 of the female connector assembly 900. When the split receptacle connector 400 is positioned in the volume 904, the arced portion 408 may contact the first plug connector 803 and the arced portion 404 may contact the second plug connector 801. Accordingly, an electrical signal that is communicated along the first receptacle connector 217 of the split receptacle connector 400 is communicated to the first plug connector 803 of the female connector assembly 900. Additionally, an electrical signal that is communicated along the second receptacle connector 219 of the split receptacle connector 400 is communicated to the second plug connector 801 of the female connector assembly 900.

Figure 9B:
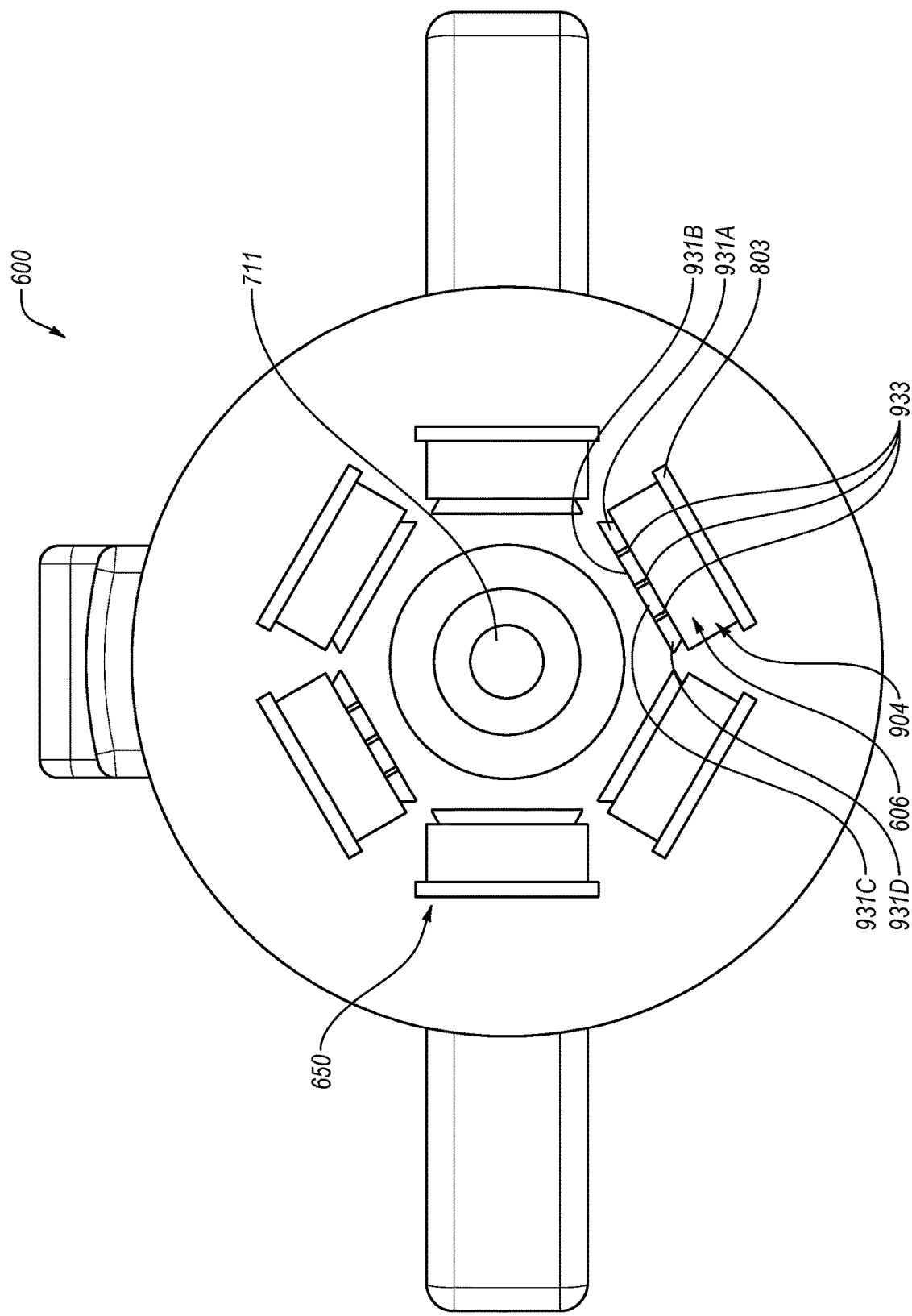
FIG. 9B illustrates another example female connector assembly that may be included in the plug assembly of FIG. 6A.

FIG. 9B illustrates another example embodiment of the female connector assembly 900. In the female connector assembly 900 of FIG. 9B, the first plug connector 803 corresponds to the SAE J2863 standard. In addition to the first plug connector 803, the female connector assembly 900 of FIG. 9B includes two or more second plug sub-connectors 931A-931D (generally, plug sub-connectors 931 or plug sub-connector 931).

The plug sub-connectors 931 may be disposed and positioned in one of the connector cavities 606 with the first plug connector 803 and positioned substantially adjacent to at least one other plug sub-connector 931. For example, the plug sub-connectors 931 may be positioned relative to the first plug connector 803 such that the volume 904 is defined between the plug sub-connectors 931 and the first plug connector 803.

The plug sub-connectors 931 may be electrically insulated from the first plug connector 803 and from each other plug sub-connectors 931. For instance, the plug sub-connectors 931 may be separated from one another by plug sub-connector insulators 933. Each of the plug sub-connectors 931 may be outside of or in addition to the SAE J2863 standard. Embodiments of the plug assembly 600 implementing the plug sub-connectors 931 may be configured to communicate with a receptacle assembly with corresponding sub-connectors.

In the embodiment of FIG. 9B, the plug connectors 650 include six female connector assemblies 900. Two of the six female connector assemblies 900 include the plug sub-connectors 931 while four of the six female connector assemblies 900 do not include the plug sub-connectors 931. In other embodiments, one or more of the female connector assemblies 900 may include plug sub-connectors 931.

Additionally, the female connector assemblies 900 of FIG. 9B that include plug sub-connectors include four of the plug sub-connectors 931. In other embodiments, the female connector assemblies 900 that include plug sub-connectors may include more than four (e.g., five, six, twenty, etc.) plug sub-connectors 931 or fewer than four (e.g., three or two) plug sub-connectors 931. Additionally still, in the embodiment of FIG. 9B, the inner (e.g., closer to the central plug connector 711) portion of the corresponding female connector assemblies 900 includes the plug sub-connectors 931. In other embodiments, the outer (e.g., farther from the central plug connector 711) portion of the corresponding female connector assemblies 900 may include the plug sub-connectors 931.

Figure 9C:
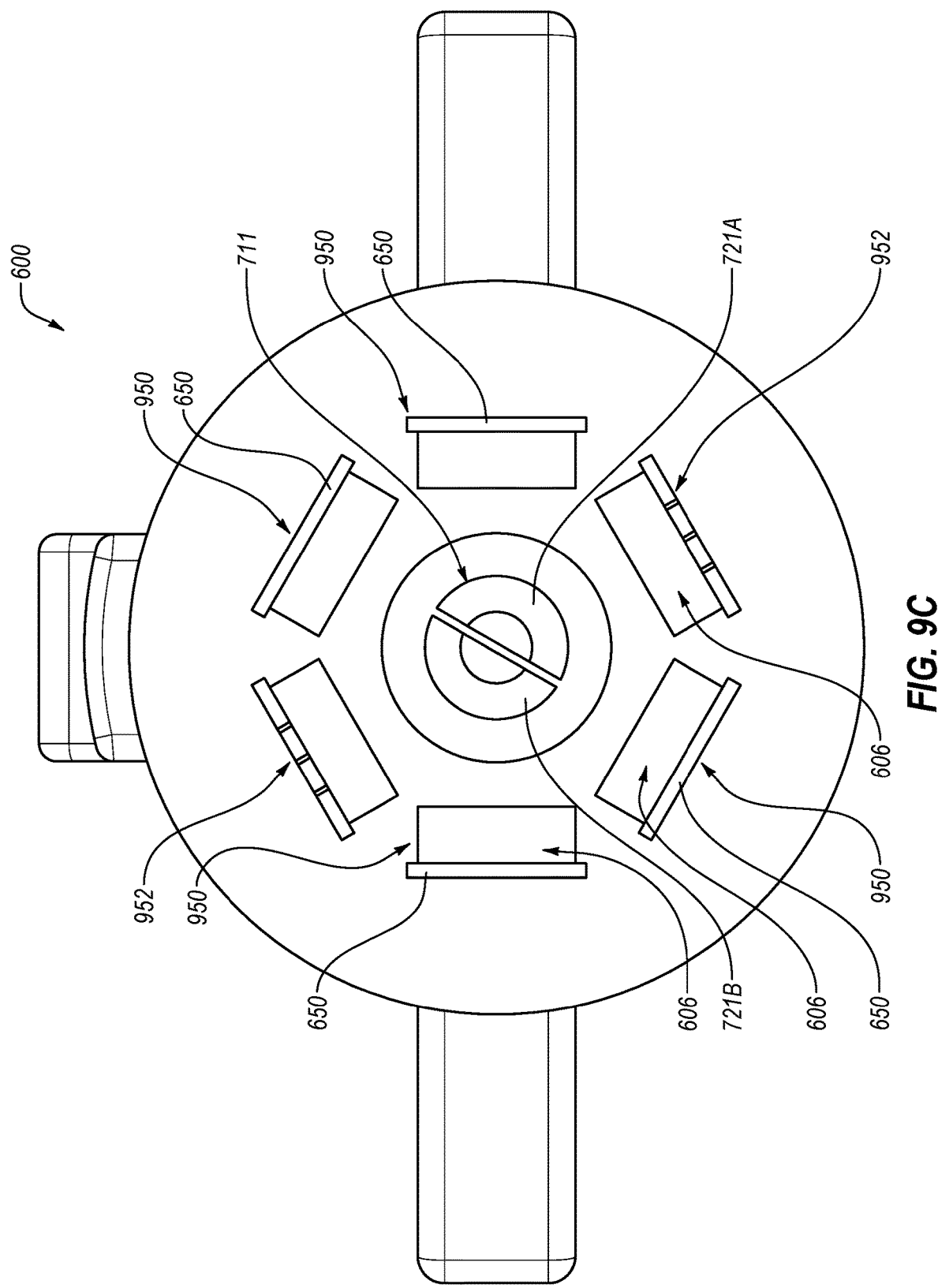
FIG. 9C illustrates example female connector assemblies that may be included in the plug assembly of FIG. 6A.

Modifications, additions, or omissions may be made to the plug assembly 600 without departing from the scope of the present disclosure. For example, in the embodiment of FIG. 9B, one of the female connector assemblies 900 includes plug sub-connectors 931. In other embodiments, the central plug connector 711 may include a split configuration. In these and other embodiments, instead of the central plug connector 711 including a single electrical connector in which a single electrical signal is communicated, two or more central electrical connectors may be included in the plug assembly 600 and may be electrically insulated from each other. For example, as illustrated in FIG. 9C, the central plug connector 711 may include a first central plug connector 721A and a second central plug connector 721B where the first central plug connector 721A and the second central plug connector 721B may be separated by an insulator tab, which may include an electrically insulating material such as plastic or air in some embodiments. In these or other embodiments, the first central plug connector 721A may correspond to the SAE J2863 standard and the second central plug connector 721B may be outside of or in addition to the SAE J2863 standard. Additionally or alternatively, the central plug connector 711 may include a plurality of sub-connectors that may be configured in a similar manner as the sub-connectors described above. In these and other embodiments, the configurations of the receptacle connectors of the receptacle assembly 200 may be arranged to accommodate the changes to the plug connector.

In addition, in the example embodiments of FIG. 9B, the inner plug connectors are illustrated as having sub-connectors. However, in some embodiments, one or more outer plug connectors may be configured with sub-connectors in a similar manner. For example, FIG. 9C illustrates example outer plug connectors 952 with sub-connectors. Further, the number of sub-connectors for the configurations like the examples of outer plug connectors 952 may be more or fewer than those illustrated in FIG. 9C. In addition, the outer plug connectors 952 may be disposed with respect to a same volume 904 as an inner plug connector 650 that also includes sub-connectors 931 or with respect to a same volume 904 as an inner plug connector 650 that does not include any sub-connectors 931. In addition, as illustrated in FIG. 9C, in some embodiments, one or more female connector assemblies of the plug assembly 600 may be configured and sized according to the SAE J2863 standard in which only an outer plug connector 650 is disposed and at least partially positioned in a cavity 606 such as illustrated by female connector assemblies 950 of FIG. 9C. In addition, in some embodiments, the plug assembly 600 may include one or more of the different plug connectors described in the present disclosure. For example, the plug assembly 600 may include one or more female connector assemblies 900 without sub-connectors 931; one or more female connector assemblies 900 with sub-connectors 931 on the inner or the outer plug connectors, one or more female connector assemblies 950, one or more female connector assemblies configured such as female connector assemblies 952, or any combination thereof.

Moreover, in some embodiments, the plug assembly 600 may include the electrical plug connectors that are configured according to the SAE J2863 standard and include a single female connector assembly 900 with the plug sub-connectors 931. All electrical systems not included in the SAE J2863 standard may be communicated using the plug sub-connectors 931.

Figure 10A:
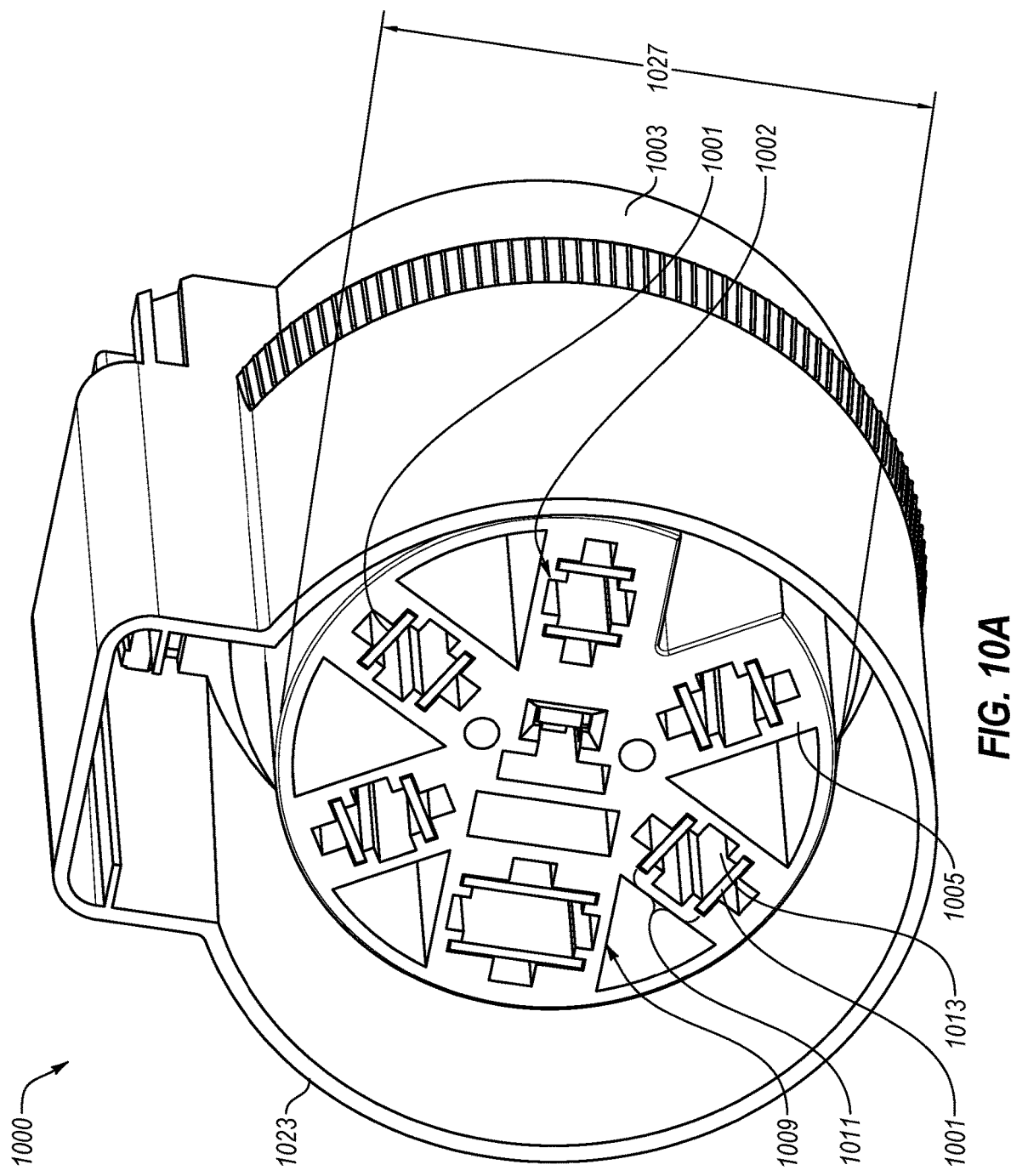
FIG. 10A illustrates an example socket assembly that may be implemented in the connector assemblies of FIGS. 1C and 1D.
Figure 10B:
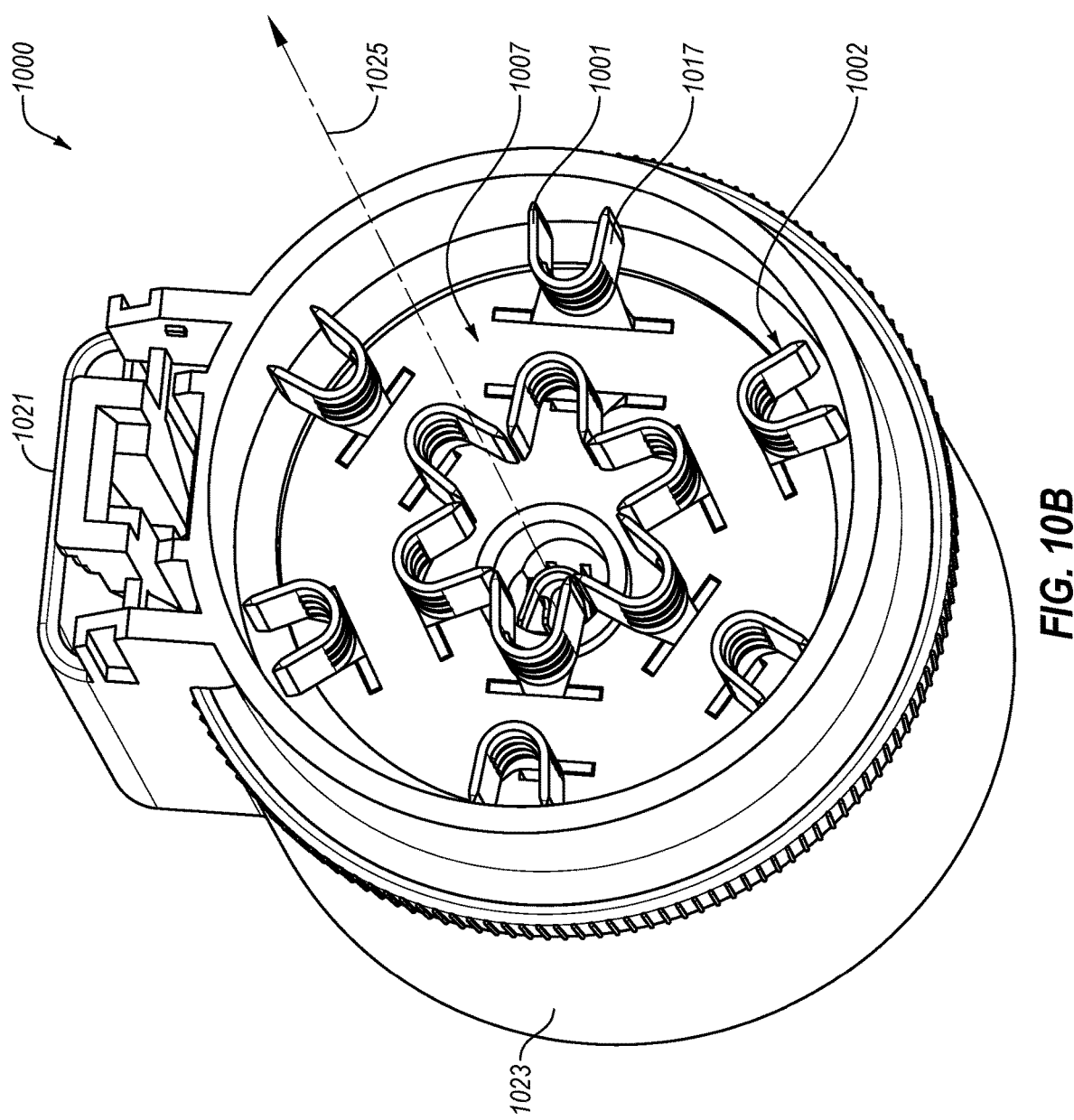
FIG. 10B illustrates another view of the socket assembly of FIG. 10A.
Figure 11:
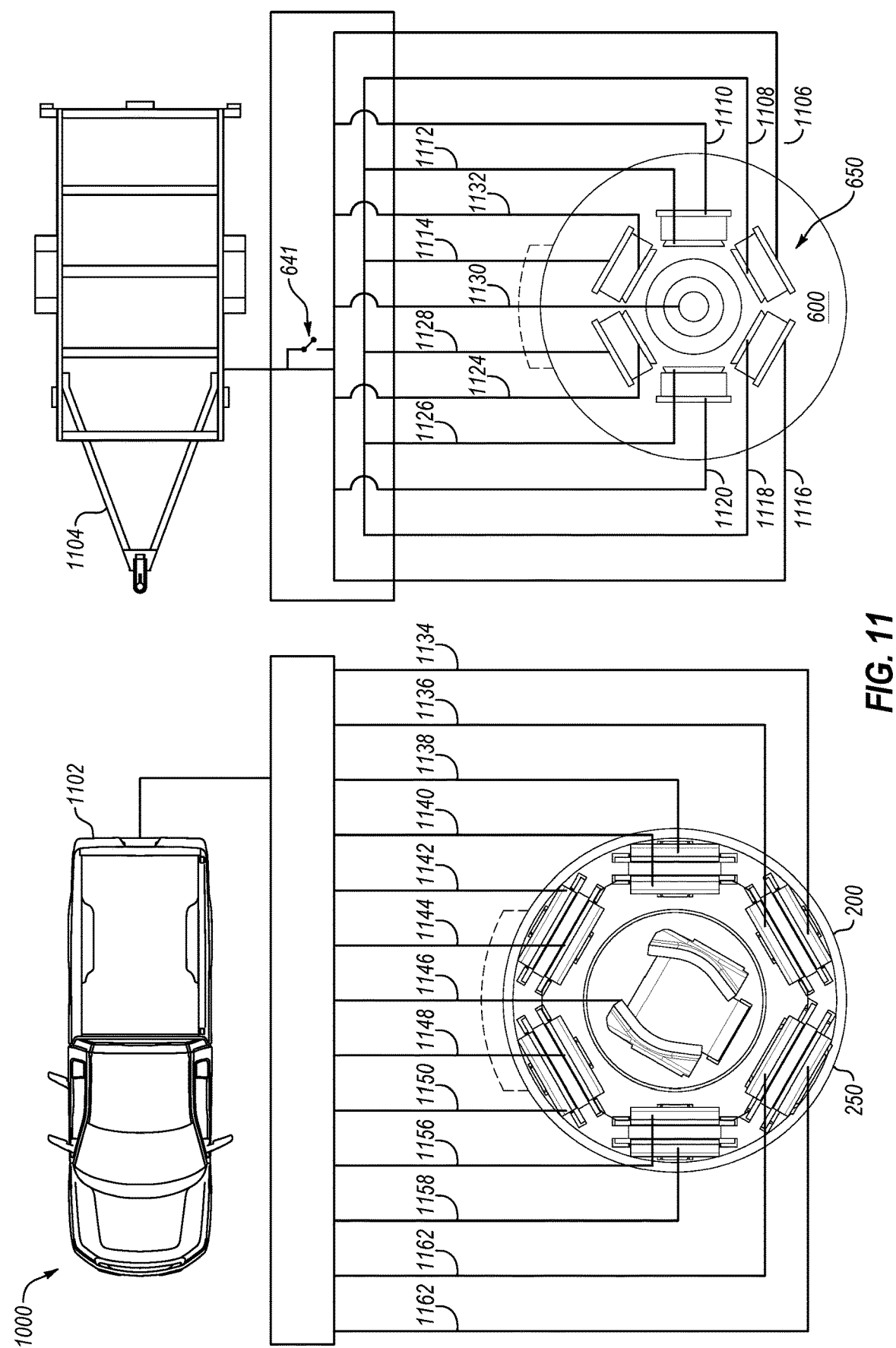
FIG. 11 illustrates an example wiring diagram that may be implemented in the connector assemblies of FIGS. 1A-1D.

FIGS. 10A and 10B illustrate an example embodiment of the socket assembly 1000 that may be implemented in the connector assembly 100 of FIGS. 1C and 1D, according to one or more embodiments of the present disclosure. FIGS. 10A and 10B are perspective views of the socket assembly 1000. FIG. 10A depicts a first perspective view in which the second portions 1009 of the socket connectors 1002 are shown. FIG. 10B depicts a second perspective view in which the first portions 1007 are shown.

The socket connectors 1002 may include multiple socket connectors 1001, only one of which is labeled in FIGS. 10A and 10B. In the embodiment of FIGS. 10A and 10B, the socket connectors 1002 may include thirteen socket connectors 1001. In other embodiments, the socket connectors 1002 may include more than thirteen or fewer than thirteen socket connectors 1001.

For example, with reference to FIGS. 2D and 10A, the number and/or arrangement of the socket connectors 1001 may correspond to the second portions 253 of the receptacle connectors 250 that extend into the second cavity 204. In particular, in at least some embodiments, the number of arrangement of the socket connectors 1001 may correspond to the rear receptacle arrangement 280 described in this disclosure. For instance, correspondence between the socket connectors 1002 and the rear receptacle arrangement 280 may result in each of the socket connectors 1001 electrically connecting to the second portions 253 of the receptacle connectors 250 of the rear receptacle arrangement 280. One or more of the socket connectors 1001 may be configured to contact one of the second portions 253 of the receptacle connectors 250. In the depicted embodiment, the socket connectors 1001 may be arranged in socket connector groups 1011, only one of which is labeled in FIG. 10A. In the socket connector groups 1011, the socket connectors 1001 of a group may be separated by a space 1013. One of the grouped connectors 282 of the receptacle connectors 250 may be positioned in the space 1013 such that the first connector 281A may contact one of the socket connectors 1002 in the socket connector group 1011 and the second connector 281B may contact another of the socket connectors 1001 in the socket connector group 1011. Reference to connector groups does not indicate that electrical signals that may be carried by the corresponding socket connectors 1001 are grouped or otherwise are associated or that the corresponding socket connectors 1001 are grouped in any other manner other than in the positioning of the socket connectors 1001.

Referring to FIG. 10B, the first portions 1007 of the socket connectors 1002 are shown. The first portions 1007 may include crimp portions 1017. Only one of the crimp portions 1017 is labelled in FIG. 10B. The crimp portions 1017 may be configured to receive a wire and to be mechanically altered to retain the wire relative to the socket connectors 1001 or the socket assembly 1000. In some embodiments, the wire may be a wire used in a tow vehicle that is electrically connected to one or more systems in the tow vehicle. The crimp portions 1017 of a first subset of the socket connectors 1002 are oriented away from a central axis 1025 of the socket assembly 1000. The crimp portions 1017 of a second subset of the socket connectors 1002 are oriented towards the central axis 1025. Orientation of the crimp portions 1017 as illustrated may enable inclusion of the twelve socket connectors 1001 in the socket assembly 1000.

Referring to FIGS. 10A and 10B, the socket assembly 1000 may include the insertion portion 1005. The insertion portion 1005 may retain the socket connectors 1002 or portions thereof. The insertion portion 1005 may be introduced and positioned in the second cavity 204 of the receptacle assembly 200. The insertion portion 1005 may include a diameter 1027 (FIG. 10A and not FIG. 10B) that is substantially similar to an inner diameter of the second cavity 204 of FIG. 2D.

The socket housing 1003 may include a border structure 1023. The border structure 1023 may surround the insertion portion 1005. The border structure 1023 may be configured to surround a portion of the receptacle housing 300 when the insertion portion 1005 is positioned in a second cavity of a receptacle assembly. For instance, with reference to FIG. 1C, the border structure 1023 may be configured to surround a portion of the receptacle housing 300 opposite the door 221 when the insertion portion 1005 is positioned in the second cavity 204. Modifications, additions, or omissions may be made to the socket assembly 1000 without departing from the scope of the present disclosure. For example, various embodiments and variations have been described with respect to the socket assembly 200 and the plug assembly 600. The socket assembly 1000 may be modified to accommodate such embodiments and variations.

FIG. 11 is a block diagram of an example wiring diagram 1100 that illustrates how the connector assemblies of FIGS. 1A-1D may be wired. The wiring diagram 1100 includes a tow vehicle 1102 and a trailer 1104. In FIG. 11, the tow vehicle 1102 is a pickup truck, but may include any other suitable tow vehicle. Similarly, the trailer 1104 is an equipment trailer, but may include any other suitable trailer such as a 5th wheel, boat trailer, equipment trailer, a camping trailer, etc.

One or more systems of the tow vehicle 1102 may be electrically connected to the receptacle assembly 200. Similarly, one or more systems of the trailer 1104 may be electrically connected to the plug assembly 600. With reference to the receptacle assembly 200, multiple wires 1162, 1160, 1158, 1156, 1150, 1148, 1146, 1144, 1142, 1140, 1138, 1136, and 1134 (collectively, receptacle wires) electrically connect one of the receptacle connectors 250 to one or more of the systems of the tow vehicle 1102. In addition, with reference to the plug assembly 600, multiple wires 1106, 1108, 1110, 1112, 1132, 1114, 1124, 1130, 1128, 1126, 1120, 1118, and 1116 (collectively, plug wires) electrically connect one of the plug connectors 650 to one or more systems of the trailer 1104. The receptacle wires electrically connect systems of the tow vehicle 1102 to one of the receptacle connectors 250. The receptacle connector 250 corresponds to one of the plug connectors 650 that is connected to a corresponding system of the trailer 1104 via one of the plug wires. In particular, the table below lists the correspondence between the receptacle wires and the plug wires.

TABLE 1

| Receptacle Assembly 200 | Plug Assembly 600 |
| --- | --- |
| Wire 1162 | Wire 1106 |
| Wire 1160 | Wire 1108 |
| Wire 1158 | Wire 1110 |
| Wire 1156 | Wire 1112 |
| Wire 1150 | Wire 1114 |
| Wire 1148 | Wire 1132 |
| Wire 1146 | Wire 1130 |
| Wire 1144 | Wire 1124 |
| Wire 1142 | Wire 1128 |
| Wire 1140 | Wire 1126 |
| Wire 1138 | Wire 1120 |
| Wire 1136 | Wire 1118 |
| Wire 1134 | Wire 1116 |

One or more of the receptacle connectors 250 of the receptacle assembly 200 may be wired according to the SAE J2863 standard. For example, the receptacle connectors 250 may be wired according to a first table, which is presented below:

TABLE 2

| Receptacle Assembly 200 | Description | Plug Assembly 600 |
| --- | --- | --- |
| Wire 1162 | Ground | Wire 1106 |
| Wire 1160 | First Additional System | Wire 1108 |
| Wire 1158 | Left Turn & Brake Light | Wire 1110 |
| Wire 1156 | Second Additional System | Wire 1112 |
| Wire 1150 | Running Lights | Wire 1114 |
| Wire 1148 | Third Additional System | Wire 1132 |
| Wire 1146 | Reverse Lights | Wire 1130 |
| Wire 1144 | Fourth Additional System | Wire 1124 |
| Wire 1142 | Auxiliary Power | Wire 1128 |

TABLE 2-continued

| Receptacle Assembly 200 | Description | Plug Assembly 600 |
| --- | --- | --- |
| Wire 1140 | Fifth Additional System | Wire 1126 |
| Wire 1138 | Right Turn & Brake | Wire 1120 |
| Wire 1136 | Sixth Additional System | Wire 1118 |
| Wire 1134 | Electrical Brakes | Wire 1116 |

The first, second, third, fourth, fifth, and sixth additional systems may include accessories or systems such as sensor systems, control systems, alarm systems, data systems, other light systems, and the like. Some examples of the additional systems may include a back-up camera, sonar systems, tire pressure monitoring systems, weight monitoring systems, alarm systems, and the like.

Alternatively, the receptacle connectors 250 may be wired according to a second table, which is presented below:

TABLE 3

| Receptacle Assembly 200 | Description | Plug Assembly 600 |
| --- | --- | --- |
| Wire 1162 | First Additional System | Wire 1106 |
| Wire 1160 | Ground | Wire 1108 |
| Wire 1158 | Second Additional System | Wire 1110 |
| Wire 1156 | Left Turn & Brake Light | Wire 1112 |
| Wire 1150 | Third Additional System | Wire 1114 |
| Wire 1148 | Running Lights | Wire 1132 |
| Wire 1146 | Reverse Lights | Wire 1130 |
| Wire 1144 | Auxiliary Power | Wire 1124 |
| Wire 1142 | Fourth Additional System | Wire 1128 |
| Wire 1140 | Right Turn & Brake | Wire 1126 |
| Wire 1138 | Fifth Additional System | Wire 1120 |
| Wire 1136 | Electrical Brakes | Wire 1118 |
| Wire 1134 | Sixth Additional System | Wire 1116 |

The plug connectors 650 may be wired to correspond to the receptacle connectors 250. When the receptacle assembly 200 is wired according to either of the above tables, the receptacle assembly 200 may receive and communicate with the plug assembly 600 or another plug assembly configured according to the SAE J2863 standard.

When the plug assembly is a 7-way plug assembly configured according to the SAE J2863 standard, some of the receptacle wires may not communicate an electrical signal with a plug connector of the plug assembly. For instance, in embodiments in which the receptacle assembly 200 is wired according to Table 2 and a 7-way plug assembly configured according to the SAE J2863 standard is inserted therein, electrical signals may be communicated along wires 1162, 1158, 1150, 1146, 1142, 1138, and 1134 to the corresponding receptacle connections, and to the corresponding plug connections and wires of the 7-way plug assembly. However, in such embodiments, electrical signals along wires 1160, 1156, 1148, 1144, 1140, and 1136 may not be communicated to the systems of the trailer 1104 because the 7-way plug assembly may not include plug connectors and wires that may correspond to the systems associated with the wires 1160, 1156, 1148, 1144, 1140, and 1136. Alternatively, in embodiments in which the receptacle assembly 200 is wired according to Table 3 and a 7-way plug assembly configured according to the SAE J2896 standard is inserted therein, electrical signals may be communicated along wires 1160, 1156, 1148, 1146, 1144, 1140, and 1136 to corresponding receptacle connections, and to the corresponding plug connections and wires of the 7-way plug assembly. However, in such instances, electrical signals along wires 1162, 1158, 1150, 1142, 1138, and 1134 may not be communicated to the systems of the trailer 1104 because the 7-way plug assembly may not include plug connectors and wires that may correspond to the systems associated with the wires 1162, 1158, 1150, 1142, 1138, and 1134.

In FIG. 11, an example of the switch mechanism 641 is shown. The switch mechanism 641 may selectively connect wires 1118, 1128, 1124, 1132, 1112, and 1108 to the trailer 1104. In some embodiments, the switch mechanism 641 may connect one or more of the other plug wires to the trailer 1104.

In embodiments in which the plug assembly 600 and/or the receptacle assembly 200 include fewer than thirteen connectors, some of the receptacle wires may be wired according to the above tables and any remaining receptacle wires may be connected to additional systems. In embodiments in which the plug assembly 600 and/or the receptacle assembly 200 include plug sub-connectors 931 or sub-connectors 431, some of the receptacle wires may be wired according to the above tables and any remaining receptacle wires may be connected to additional systems.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one," "one or more," "at least one of the following," and "one or more of the following" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A receptacle assembly for a vehicle-trailer wiring connector assembly, the receptacle assembly comprising:
    a receptacle housing that includes a first cavity, the first cavity extending from a first end of the receptacle housing to a central structure of the receptacle housing;
    a housing opening defined at the first end, wherein at least a portion of the first cavity and at least a portion of the housing opening is sized and shaped according to the Society of Automotive Engineers ("SAE") J2863 standard;
    a first receptacle connector with a first portion that extends from the central structure into the first cavity; and
    a second receptacle connector with a second portion that extends from the central structure into the first cavity, wherein the first receptacle connector and the second receptacle connector are sized and are disposed with respect to each other such that the first receptacle connector and the second receptacle connector are configured to both be inserted into a single connector cavity of a plug assembly in which the connector cavity is sized and shaped to comply with the SAE J2863 standard and wherein the first receptacle connector and the second receptacle connector are configured such that the second receptacle connector is electrically insulated from the first receptacle connector.

2. The receptacle assembly of claim 1, wherein the second receptacle connector is radially displaced from the first receptacle connector such that the second receptacle connector is positioned between the first receptacle connector and a central axis of the receptacle housing.

3. The receptacle assembly of claim 1, further comprising an insulator tab that is positioned between the second receptacle connector and the first receptacle connector.

4. The receptacle assembly of claim 3, wherein:
    the first receptacle connector includes a first substantially planar portion that is radially displaced from the central axis;
    the second receptacle connector includes a second substantially planar portion that is radially displaced between the first substantially planar portion and the central axis and that is oriented substantially parallel to the first substantially planar portion; and
    the insulator tab contacts the first substantially planar portion and the second substantially planar portion.

5. The receptacle assembly of claim 4, wherein:
    the first receptacle connector includes a first arced portion that is coupled to the first substantially planar portion and that extends away from the central axis; and
    the second receptacle connector includes a second arced portion that is coupled to the second substantially planar portion and that extends towards the central axis.

6. The receptacle assembly of claim 1, wherein:
    the receptacle housing includes a second cavity that extends from the central structure in a direction away from the housing opening;
    a first portion of the first receptacle connector extends into the second cavity as a first male electrical connector in the second cavity; and
    a second portion of the second receptacle connector extends into the second cavity as a second male electrical connector in the second cavity.

7. The receptacle assembly of claim 1, wherein:
    the first receptacle connector is one of six first receptacle connectors; and
    each of the first receptacle connectors is disposed and positioned in the first cavity in a hexagonal arrangement in accordance with the SAE J2863 standard.

8. The receptacle assembly of claim 7, wherein:
    the second receptacle connector is one of a plurality of second receptacle connectors; and
    each second receptacle connector of the plurality of second receptacle connectors is paired with an individual one of the first receptacle connectors, wherein the first receptacle connector and the second receptacle connector of each pair are sized and are disposed with respect to each other such that the first receptacle connector and the second receptacle connector of each pair are configured to both be inserted into one of six connector cavities of the plug assembly that are disposed in the hexagonal arrangement in compliance with the SAE J2863 standard and such that the first receptacle connector and the second receptacle connector of each pair are electrically insulated from each other.

9. The receptacle assembly of claim 1, wherein:
    the first receptacle connector is sized and positioned such that, when the plug assembly is plugged into the receptacle assembly, the first receptacle connector contacts an electrical connector that is disposed in the connector cavity of the plug assembly in accordance with the SAE J2863 standard; and
    the second receptacle connector is sized and positioned such that, when the plug assembly is plugged into the receptacle assembly, the second receptacle connector is electrically insulated from the electrical connector disposed in the connector cavity.

10. The receptacle assembly of claim 1, wherein:
    the second receptacle connector is one of a plurality of receptacle sub-connectors; and
    the first receptacle connector and the plurality of receptacle sub-connectors are sized, shaped, and are disposed with respect to each other such that:
        the first receptacle connector and the plurality of receptacle sub-connectors are configured to all be inserted into the connector cavity of the plug assembly;
        the first receptacle connector and the plurality of receptacle sub-connectors are electrically insulated from each other;

the first receptacle connector includes a first substantially planar portion disposed in a first plane that is radially displaced from the central axis; and the plurality of receptacle sub-connectors each include a sub-connector substantially planar portion disposed in a second plane that is oriented substantially parallel to the first plane and radially displaced between the first substantially planar portion and the central axis.

11. The receptacle assembly of claim 1, wherein:

the first receptacle connector and the second receptacle connector are sized and are disposed with respect to each other such that the first receptacle connector and the second receptacle connector are configured to both be inserted into a connector cavity of an other plug assembly;

the other plug assembly is configured to be inserted in the housing opening and the first cavity and is different from the plug assembly;

the connector cavity of the other plug assembly includes a first electrical connector and a second electrical connector electrically insulated from the first electrical connector;

the first receptacle connector and the second receptacle connector are configured to be inserted into the connector cavity of the other plug assembly when the other plug assembly is inserted in the housing opening and the first cavity;

the first receptacle connector is configured to contact the first electrical connector but not the second electrical connector when the first receptacle connector and the second receptacle connector are inserted into the connector cavity of the other plug assembly; and the second receptacle connector is configured to contact the second electrical connector but not the first electrical connector when the first receptacle connector and the second receptacle connector are inserted into the connector cavity of the other plug assembly.

12. The receptacle assembly of claim 1, wherein:

the first receptacle connector is sized and positioned such that, when the plug assembly is plugged into the receptacle assembly, the first receptacle connector contacts an electrical connector that is disposed in the first connector cavity of the plug assembly in accordance with the SAE J2863 standard; and the seventh receptacle connector is sized and positioned such that, when the plug assembly is plugged into the receptacle assembly, the seventh receptacle connector is electrically insulated from the electrical connector disposed in the first connector cavity.

13. The receptacle assembly of claim 1, wherein:

the seventh receptacle connector is one of a plurality of receptacle sub-connectors; and the first receptacle connector and the plurality of receptacle sub-connectors are sized, shaped, and are disposed with respect to each other such that:

the first receptacle connector and the plurality of receptacle sub-connectors are configured to all be inserted into the first connector cavity of the plug assembly;

the first receptacle connector and the plurality of receptacle sub-connectors are electrically insulated from each other;

the first receptacle connector includes a first substantially planar portion disposed in a first plane that is radially displaced from the central axis; and the plurality of receptacle sub-connectors each include a sub-connector substantially planar portion disposed in a second plane that is oriented substantially parallel to the first plane and radially displaced between the first substantially planar portion and the central axis.

14. A receptacle assembly for a vehicle-trailer wiring connector assembly, the receptacle assembly comprising:

a receptacle housing that includes a first cavity that is sized and shaped according to the Society of Automotive Engineers ("SAE") J2863 standard;

a first receptacle connector disposed in the first cavity;

a second receptacle connector disposed in the first cavity;

a third receptacle connector disposed in the first cavity;

a fourth receptacle connector disposed in the first cavity;

a fifth receptacle connector disposed in the first cavity;

a sixth receptacle connector disposed in the first cavity, wherein the first receptacle connector, the second receptacle connector, the third receptacle connector, the fourth receptacle connector, the fifth receptacle connector, and the sixth receptacle connector are disposed in the first cavity in a hexagonal arrangement that is in accordance with the SAE J2863 standard; and a seventh receptacle connector disposed in the first cavity, wherein the first receptacle connector and the seventh receptacle connector are sized and are disposed with respect to each other such that the first receptacle connector and the seventh receptacle connector are configured to both be inserted into a first connector cavity of a plug assembly in which the connector cavity is sized and shaped to comply with the SAE J2863 standard and wherein the first receptacle connector and the seventh receptacle connector are configured such that the seventh receptacle connector is electrically insulated from the first receptacle connector.

15. The receptacle assembly of claim 14, wherein the seventh receptacle connector is radially displaced from the first receptacle connector such that the seventh receptacle connector is positioned between the first receptacle connector and a central axis of the receptacle housing.

16. The receptacle assembly of claim 14, further comprising an insulator tab that is positioned between the seventh receptacle connector and the first receptacle connector.

17. The receptacle assembly of claim 16, wherein:

the first receptacle connector includes a first substantially planar portion that is radially displaced from the central axis;

the seventh receptacle connector includes a seventh substantially planar portion that is radially displaced between the first substantially planar portion and the central axis and that is oriented substantially parallel to the first substantially planar portion; and the insulator tab contacts the first substantially planar portion and the seventh substantially planar portion.

18. The receptacle assembly of claim 14, further comprising:

a first central electrical connector disposed inside of the hexagonal arrangement; and a second central electrical connector disposed inside of the hexagonal arrangement, the second central electrical connector being electrically insulated from the first central electrical connector.

19. The receptacle assembly of claim 14, further comprising an eighth receptacle connector disposed in the first cavity, wherein the second receptacle connector and the eighth receptacle connector are sized and are disposed with respect to each other such that the second receptacle connector and the eighth receptacle connector are configured to both be inserted into a second connector cavity of the plug assembly in which the second connector cavity is sized and shaped to comply with the SAE J2863 standard and wherein the second receptacle connector and the eighth receptacle connector are configured and such that the eighth receptacle connector is electrically insulated from the second receptacle connector.

20. The receptacle assembly of claim 14, wherein:
the first receptacle connector and the seventh receptacle connector are sized and are disposed with respect to each other such that the first receptacle connector and the seventh receptacle connector are configured to both be inserted into a connector cavity of an other plug assembly;
the other plug assembly is configured to be inserted in the first cavity and is different from the plug assembly;
the connector cavity of the other plug assembly includes a first electrical connector and a second electrical connector electrically insulated from the first electrical connector;
the first receptacle connector and the seventh receptacle connector are configured to be inserted into the connector cavity of the other plug assembly when the other plug assembly is inserted in the first cavity;
the first receptacle connector is configured to contact the first electrical connector but not the second electrical connector when the first receptacle connector and the seventh receptacle connector are inserted into the connector cavity of the other plug assembly; and
the seventh receptacle connector is configured to contact the second electrical connector but not the first electrical connector when the first receptacle connector and the seventh receptacle connector are inserted into the connector cavity of the other plug assembly.

* * * * *